(12) United States Patent
Ozeki et al.

(10) Patent No.: US 7,336,271 B2
(45) Date of Patent: Feb. 26, 2008

(54) IMAGE DISPLAY SYSTEM

(75) Inventors: Masao Ozeki, Yokohama (JP);
Masanobu Isshiki, Yokohama (JP);
Shinya Tahara, Yokohama (JP);
Toshihiko Suzuki, Yokohama (JP)

(73) Assignee: OPTREX Corporation, Tokyo (JP)

( * ) Notice: Subject to any disclaimer, the term of this patent is extended or adjusted under 35 U.S.C. 154(b) by 527 days.

(21) Appl. No.: 11/070,887

(22) Filed: Mar. 3, 2005

(65) Prior Publication Data
US 2005/0243078 A1 Nov. 3, 2005

Related U.S. Application Data

(63) Continuation of application No. PCT/JP03/11264, filed on Sep. 3, 2003.

(30) Foreign Application Priority Data

Sep. 3, 2002 (JP) ............... 2002-258234
Nov. 20, 2002 (JP) ............... 2002-337063

(51) Int. Cl.
*G09G 5/00* (2006.01)
(52) U.S. Cl. ............... 345/204; 345/3.1; 345/206
(58) Field of Classification Search ............... 345/96, 345/30, 48, 204, 3.1, 97, 102, 101, 63, 206; 349/89, 65, 57, 62
See application file for complete search history.

(56) References Cited

U.S. PATENT DOCUMENTS

| | | | | |
|---|---|---|---|---|
| 4,319,237 A | * | 3/1982 | Matsuo et al. ............... | 345/101 |
| 5,473,450 A | * | 12/1995 | Yamada et al. ............... | 349/84 |
| 5,764,317 A | | 6/1998 | Sadovnik et al. | |
| 7,259,730 B2 | * | 8/2007 | O'Keeffe ............... | 345/30 |
| 2002/0036614 A1 | * | 3/2002 | Nagai et al. ............... | 345/95 |
| 2002/0134966 A1 | * | 9/2002 | Tahara et al. ............... | 252/299.61 |
| 2003/0142057 A1 | * | 7/2003 | Niiyama et al. ............... | 345/97 |
| 2003/0151580 A1 | * | 8/2003 | Ma ............... | 345/96 |
| 2004/0160388 A1 | * | 8/2004 | O'Keeffe ............... | 345/30 |

FOREIGN PATENT DOCUMENTS

| | | |
|---|---|---|
| EP | 1154006 A1 | 11/2001 |
| JP | 2-282784 | 11/1990 |
| JP | 02-282784 A | 11/1990 |
| JP | 04-114088 U | 10/1992 |
| JP | 05-191726 A | 7/1993 |
| JP | 09-257523 A | 10/1997 |
| JP | 10-49800 | 2/1998 |
| JP | 10-049800 A | 2/1998 |
| JP | 11-164327 A | 6/1999 |
| JP | 2000-115812 A | 4/2000 |
| JP | 2001-320739 A | 11/2001 |
| JP | 2002-139700 | 5/2002 |
| JP | 2002-139700 A | 5/2002 |

* cited by examiner

*Primary Examiner*—Prabodh Dharia
(74) *Attorney, Agent, or Firm*—Oblon, Spivak, McClelland, Maier & Neustadt, P.C.

(57) ABSTRACT

An image display system includes a screen comprising a pair of substrates with transparent electrodes provided thereon, and a liquid crystal layer sandwiched between the substrates, the liquid crystal layer containing a cured resin and being capable of exhibiting a light transmissive state and a light scattering state; and an image-projecting unit for projecting an image on the screen; wherein a frame comprising a combination of the light transmissive state and the light scattering state as a minimum repetitive satisfies a certain relationship.

12 Claims, 17 Drawing Sheets

(a)

(b)

(c)

(e)

IMAGE DISPLAY SYSTEM

TECHNICAL FIELD

The present invention relates to an image display system wherein a transparent member, such as a glass member, is used as a screen, and an image projected from a projector is displayed on the screen.

BACKGROUND ART

With respect to current image display systems, such as CRTs, PDPs and liquid crystal displays, attempts have been rapidly made to make the display portions thinner or flat.

However, since the display portions per se are not transparent, the display portions per se are unpleasant to the eye or give a feeling of oppression to a viewer when the display portions are active and even when the display portions are not active. For these reasons, it has been demanded to provide a display portion, which can turn transparent so as to give a feeling of expansion to a viewer and allows the viewer to see a scene behind the display portion.

As one of the solutions, there is, e.g., a display system called a head-up display for a car. This is a method wherein an image projected from an image-projecting unit is reflected by a half-mirror provided on a windshield or by a hologram system whereby the image looks like being displayed on the windshield. In this method, since the half-mirror or the hologram system is not completely transparent when no image is displayed, the half-mirror or the hologram system is visible and unpleasant to the eye.

There is also a display system, which uses a hologram screen to provide attractive display in, e.g., a show window at a shop. In this system, light that enters a hologram screen from a projector at a particular angle is scattered on the hologram screen to display an image. This system can display an image having a high contrast since light that enter at angles other than the particular angle is not scattered. However, when a viewer is located at an oblique position to the screen, the viewer cannot see an image since this system has a narrow viewing angle because of a viewing angle dependency.

JP-U-04-114088 has disclosed an image display system, which uses a single screen as the transparent member, and which switches the screen from a light transmissive state to a light scattering state or vice versa (see the abstract and FIG. 1). This system can not realize a state with an image displayed in a background scene since the screen is not transparent while displaying the image.

On the other hand, JP-A-05-191726 has disclosed a technique to realize a state with an image displayed in a background scene (see paragraph number 0010 and FIG. 1). This technique brings only a portion to display an image into a scattering state to use that portion as a screen. When the image is displayed, it is not possible to see a scene behind the image. This publication is silent about a technique to use a plurality of screens.

The technique to use a plurality of screens has been disclosed in JP-A-05-307185 (see paragraph numbers 0020 and 0021, and FIGS. 4 and 5). This publication is silent about an idea of allowing a viewer to see a background scene.

Additionally, JP-A-2002-139700 has disclosed a technique, which displays a three-dimensional image on a screen comprising a plurality of liquid crystal cells (see paragraph numbers 0019 to 0021, and FIGS. 1 and 2). This publication is also silent about an idea of allowing a viewer to look a background scene.

DISCLOSURE OF THE INVENTION

It is an object of the present invention to provide a novel and unique technique capable of preventing a screen per se from being unpleasant to the eye, giving almost no feeling of oppression to a viewer and giving a feeling of expansion to the viewer when the screen is not active, and capable of displaying an image having a feeling of transparency when the screen is active, whereby the viewer can see an image on the screen and a scene behind the screen.

It is another object of the present invention to provide a novel and unique technique capable of realizing a state wherein a viewer can have an impression that a transparent image looks like floating in the air or of displaying a three-dimensional image having a feeling of depth.

According to a first aspect of the present invention, there is provided an image display system including a screen comprising a pair of substrates with transparent electrodes provided thereon, and a liquid crystal layer sandwiched between the substrates, the liquid crystal layer being capable of exhibiting a light transmissive state and a light scattering state, and an image-projecting unit for projecting an image on the screen; wherein when a voltage is applied across confronting transparent electrodes, the liquid crystal layer exhibits the light scattering state, and when no voltage is applied across confronting transparent electrodes, the liquid crystal layer exhibits the light transmissive state; wherein the screen is provided to face the image-projecting unit so that when the liquid crystal layer exhibits the light scattering state, an image projecting from the image-projecting unit can be focused on the screen to be visually recognized; wherein a repetition frequency of a combination of the light transmissive state and the light scattering state as a minimum repetitive unit can be set at a value in such a range that a viewer cannot recognize flickering of the image on the screen recognized; and wherein proportions of a time period $T_1$ wherein the liquid crystal layer of the screen exhibits the light scattering state and a time period $T_2$ wherein the liquid crystal layer of the screen exhibit the light transmissive state are set in one frame so that the viewer can simultaneously recognize the image on the screen and a scene behind the screen.

According to a second aspect of the present invention, in the image display system according to the first aspect, the screen includes a plurality of screen; and the screens are provided so as to have display surfaces overlapped each other so that when the liquid crystal layers of the respective screens exhibit the light scattering state, different images projected from the image-projecting unit are displayed on the respective screens, whereby the images on the respective screens are made different each other.

According to a third aspect of the present invention, in the image display system according to the first or second aspect, the repetition frequency in the one frame is set at a value of 33 Hz or higher; and the proportions of $T_1$ and $T_2$ are set so as to meet a relationship of $T_1/(T_1+T_2) \leq 0.8$.

According to a fourth aspect of the present invention, there is provided an image display system including a screen comprising a pair of substrates with transparent electrodes provided thereon, and a liquid crystal layer sandwiched between the substrates, the liquid crystal layer being capable of exhibiting a light transmissive state and a light scattering state, and an image-projecting unit for projecting an image on the screen; wherein when a voltage is applied across confronting transparent electrodes, the liquid crystal layer exhibits the light scattering state, and when no voltage is applied across confronting transparent electrodes, the liquid crystal layer exhibits the light transmissive state; wherein the screen is provided to face the image-projecting unit; wherein the liquid crystal layer contains a liquid crystal and a cured resin having a mesogen structure, the liquid crystal including liquid crystal molecules having a pretilt angle of 60 deg or more with respect to a substrate surface; and wherein when the liquid crystal layer exhibits the light scattering state, an image projected from image-projecting unit is be focused on the liquid crystal layer to be visually recognized.

According to a fifth aspect of the present invention, in the image display system according to the fourth aspect, the repetition frequency in the one frame is set at a value of 33 Hz or higher.

According to a sixth aspect of the present invention, in the image display system according to the first, second, third or fourth aspect, the screen comprises a plurality of screens, and a rise time required for the liquid crystal layer of a screen to change from the light transparent state into the light transmissive state and a fall time required for of the liquid crystal layer of another screen to change from the light scattering state into the light transmissive state are set so that the rise time and the fall time temporal overlap each other when the respective screens are sequentially driven.

According to a seventh aspect of the present invention, in the image display system according to any one of the first to sixth aspects, the screen comprises a plurality of screens so that adjacent screens have a distance of 0.4 to 200 mm therebetween; and images projected on at least two screens have different brightnesses.

According to an eighth aspect of the present invention, in the image display system according to any one of the first to seventh aspects, the liquid crystal and the cured resin in the liquid crystal layer are formed by curing by a photopolymerization method.

According to a ninth aspect of the present invention, in the image display system according to any one of the first to eighth aspects, the screen has an instrument, an information terminal or a mirror provided therebehind.

According to a tenth aspect of the present invention, in the image display system according to any one of the first to ninth aspects, the screen has a main part of a peripheral portion formed so as to be transparent.

According to an eleventh aspect of the present invention, in the image display system according to the tenth aspect, the screen is transparent except a portion to be connected with an external circuit.

According to an twelfth aspect of the present invention, in the image display system according to any one of the first to eleventh aspects, the screen has a transmittance of 80% or higher when no voltage is applied.

In accordance with the present invention, when the image display system is not active, the screen can turn transparent to be prevented itself from being unpleasant to the eye, minimize a feeling of oppression to a viewer and give a feeling of expansion to the viewer. When the image display system is active, the screen can display an image having a feeling of transparency, whereby the viewer can simultaneously see an image on the screen and a scene behind the screen.

Additionally, the image display system can realize a state wherein the viewer can have an impression that a transparent image looks like floating in the air.

The image display system can display a three-dimensional image having a feeling of depth as required.

BEST MODE FOR CARRYING OUT THE INVENTION

Figure 1:
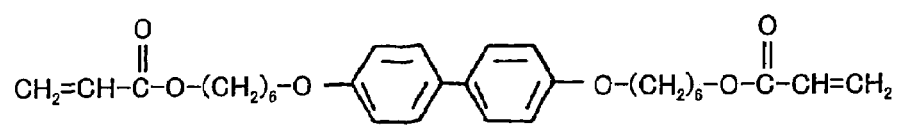
FIG. 1 is a list showing examples of curable compounds applicable to the screen according to the present invention.
Figure 1:
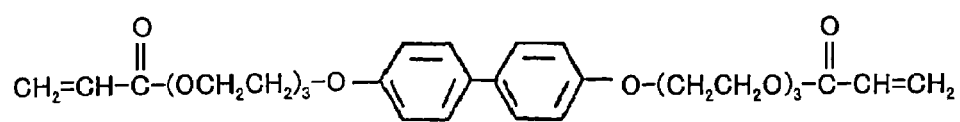
Figure 1:
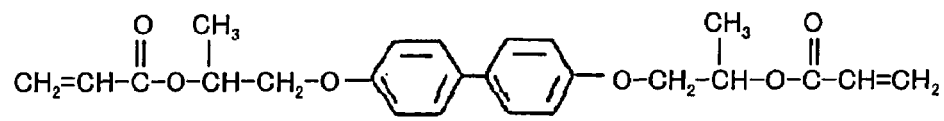
Figure 1:
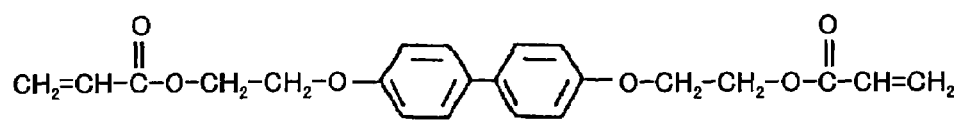

Now, embodiments of the present invention will be described, referring to the accompanying drawings and examples. These drawings, the examples and the descriptions are generally illustrative of the present invention but are not to be considered as limiting the present invention to the specifics thereof. Embodiments other than the embodiments shown in the drawings or referred to in the description should be understood to be within the scope of the invention as long as they accord with the spirit of the invention. In the drawings, identical or similar elements are indicated by the same reference numerals.

The screen according to the present invention is configured so that a liquid crystal layer can repeatedly exhibit a light transmissive state and a light scattering state. The light transmissive state and the light scattering state are distinguished in terms of visible light. It is preferable that the screen has a higher light transmittance in the light transmissive state so that when a viewer does not see an image on the screen, the screen is transparent and gives a feeling of expansion to the viewer, and when the viewer sees an image on the screen, the screen gives such a feeling of transparency to the viewer that the viewer can see circumstances behind the screen. The feeling of expansion or the feeling of transparency may be appropriately determined in accordance with requirements. There is no particular limitation to the light scattering state. However, in order that the viewer observes an image projected on the screen, on a rear side of the screen, i.e., the side opposite to a side of the screen that the image is projected on, it is preferable that the screen has a higher rate of forward scattering. In order that the viewer observes the image on the side of the screen that the image is projected on, it is preferable that the screen has a higher rate of backward scattering.

Switching of the light transmissive state and the light scattering state can be realized by providing the screen with a liquid crystal layer and a pair of substrates having transparent electrodes, so that when a voltage is applied across confronting transparent electrodes, the liquid crystal layer exhibits the light scattering state, and when no voltage is applied across confronting transparent electrodes, the liquid crystal layer exhibits the light transmissive state, for instance.

As the liquid crystal layer, a composite comprising a liquid crystal and a cured resin may be employed. The liquid crystal layer comprising a liquid crystal and a cured resin may be formed as a liquid crystal/cured resin composite layer by sandwiching a liquid crystal and a composition containing a curable compound between the paired substrates with the transparent electrodes and curing the curable compound with, e.g., heat, ultraviolet light or an electron beam.

As the cured resin according to the present invention, any known cured resins are applicable as long as they have transparency and as long as they are not against the spirit of the invention. From the viewpoint of providing the liquid crystal layer with rapid response, it is preferable that the liquid crystal layer has a structure wherein the liquid crystal and the cured resin are separated in order that only the liquid crystal is substantially responsive at the time of application of a voltage.

With regard to the curable compound for forming the cured resin having the structure stated earlier, a curable compound, which is dissoluble in the liquid crystal, can be selected to control the alignment state of the mixture before curing, whereby high transparency can be maintained after the cured resin has been cured. In the present invention, the image may include character information. Additionally, the image may include an image with the contents changing with lapse of time, a moving image with a frame being skipped, a normal moving image or the like.

From the viewpoint of minimizing the occurrence of alignment defect and of improving the transparency, it is preferable that the side of each of the paired substrates in contact with the liquid crystal layer is treated so that liquid crystal molecules have a pretilt angle of 60 deg or more with respect to a substrate surface. Rubbing may be applied or eliminated. It is more preferable that the pretilt angle is not less than 70 deg. With regard to the pretilt angle, the direction perpendicular to the substrate surfaces is defined as 90 deg.

Examples of the curable compound are a compound of the formula (1) and a compound of the formula (2):

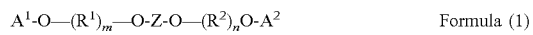  Formula (1)

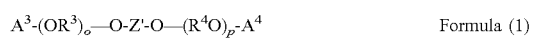  Formula (1)

wherein each of $A^1$, $A^2$, $A^3$ and $A^4$, which are independent of each other, is an acryloyl group, a methacryloyl group, a glycidyl group or an allyl group; each of $R^1$, $R^2$, $R^3$ and $R^4$, which are independent of each other, is a $C_{2-6}$ alkylene group; each of Z and Z', which are independent of each other, is a bivalent mesogen structure; and each of m, n, o and p, which are independent of each other, is an integer of from 1 to 10.

The oxyalkylene structures containing $R^1$, $R^2$, $R^3$ and $R^4$ and having a high molecular mobility are introduced between the mesogen structural portions Z and Z', and the curable sites $A^1$, $A^2$, $A^3$ and $A^4$ in the formulas (1) and (2), whereby the molecular mobility at the curable sites in the curing process can be improved, and it is possible to attain sufficient curing for a short time.

The curable sites $A^1$, $A^2$, $A^3$ and $A^4$ of the formulas (1) and (2) may be any one of the above-mentioned functional groups which are photo curable or heat curable. Among them, an acryloyl group or a methacryloyl group suitable for photo curing is preferred since the temperature for the curing can be controlled.

The carbon numbers of $R^1$, $R^2$, $R^3$ and $R^4$ of the formulas (1) and (2) are preferably from 1 to 6 from the viewpoint of the molecular mobility. An ethylene group having a carbon number of 2 and a propylene group having a carbon number of 3 are more preferred.

An example of each of the mesogen structural portions Z and Z' of the formulas (1) and (2) is a polyphenylene group having 1,4-phenlylene groups bonded. Some or all of 1,4-phenlylene groups may be substituted by a 1,4-cyclohexylene group. Some or all of the hydrogen atoms of the 1,4-phenlylene groups or the substituted 1,4-cyclohexylene group may be substituted by a substituent, such as a $C_{1-2}$ alkyl group, a halogen atom, a carboxyl group or an alkoxycarbonyl group.

Preferable examples of each of the mesogen structural portions Z and Z' are a biphenylene group having two 1,4-phenlylene groups bonded (hereinbelow, the biphenylene group having two 1,4-phenlylene groups bonded is also referred to as a 4,4-biphenlylene group), a terphenylene group having three such phenlylene groups bonded, and a group having from 1 to 4 hydrogen atoms of such a group substituted by a $C_{1-2}$ alkyl group, a fluorine atom, a chlorine atom or a carboxyl group. The most preferred example of each of the mesogen structural portions is a 4,4'-biphenylene group having no substituent. The 1,4-phenlylene groups or the 1,4-cyclohexylene groups forming each of the mesogen structural portions may be all linked to each other by single bond or by any one of the bonds shown below:

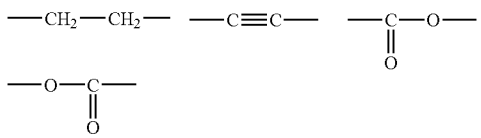

Each of m, n, o and p of the formulas (1) and (2) is preferably from 1 to 10, more preferably from 1 to 4. If each of them is too large, the compatibility with a liquid crystal deteriorates, lowering the transparency of a screen after curing.

FIG. 1 shows examples of the curable compounds applicable to the present invention. A composition having a liquid crystal and a curable compound contained therein may contain a plurality of curable compounds containing the curable compounds represented by the formula (1) or (2). For example, when the compound contains a plurality of curable compounds represented by the formulas (1) and (2) and having different m, n, o and p, the compatibility with the liquid crystal can improve in some cases.

The composition having a liquid crystal and a curable compound contained therein may contain a curing catalyst. In the case of photo curing, a photopolymerization initiator commonly used for photo curing, such as a benzoin ether type, an acetophenone type or a phosphine oxide type, may be employed. In the case of thermosetting, a curing catalyst, such as a peroxide type, a thiol type, an amine type or an acid anhydride type, may be used, depending on the type of the curable sites. If necessary, a cured assistant, such as an amine, may be also used.

The content of the curing catalyst is preferably at most 20 wt % of the curable compound contained. In a case where a high molecular weight or a high resistivity is required for the cured resin after curing, it is more preferably from 1 to 10 wt %.

As the treatment for aligning liquid crystal molecules so as to have a pretilt angle of 60 deg or more with a substrate surface, there is a method employing a vertical alignment agent. Examples of the method employing a vertical alignment agent are a method employing a detergent, a method to treat a substrate surface with, e.g., a silane coupling agent containing an alkyl group or a fluoroalkyl group, and a method employing a commercially available vertical alignment agent, such as SE1211 manufactured by Nissan Chemical Industrial, Ltd. or JALS-682-R3 manufactured by JSR Corporation. In order to obtain a state where liquid crystal molecules are put down in arbitrary directions from a vertical alignment state, any known methods may be adopted. The vertical alignment agent may be allied by rubbing. There may be adopted a method wherein electrodes have slits obliquely formed therein or triangular prisms formed thereon in order to obliquely apply a voltage across substrates.

Although the liquid crystal according to the present invention may be appropriately selected among known liquid crystals, it is preferable that a liquid crystal having a negative dielectric anisotropy. In order to lower the driving voltage, it is preferable that the dielectric anisotropy is larger.

As substrates applicable to the screen, any one of known substrates may be used as long as required transparency is ensured. Glass substrates may be used. The substrates may be made of a plastic material or a film. The screen surface does not need to be flat and may be formed in a curved shape.

The electrodes provided on the substrates may be made of a transparent electrode material of metal oxide, such as ITO (indium oxide/tin oxide).

The combination of the alignment directions of a pair of alignment-treated substrates may be parallel or orthogonal, and the alignment directions may be set at an appropriate angle. By forming a thin resin film on the electrode surfaces of substrates with electrodes and rubbing the thin film, a known function, which aligns portions of the liquid crystal on the electrode surfaces, may be applied.

The thickness of a liquid crystal layer between two substrates can be determined by, e.g., spacers. The gap is preferably from 1 to 50 µm, more preferably 3 to 30 µm. When the thickness of the liquid crystal layer is too narrow, the contrast tends to deteriorate, and when the thickness of the liquid crystal layer is too wider, the driving voltage tends to increase. Both of the results are not preferable in most of cases.

Figure 2:
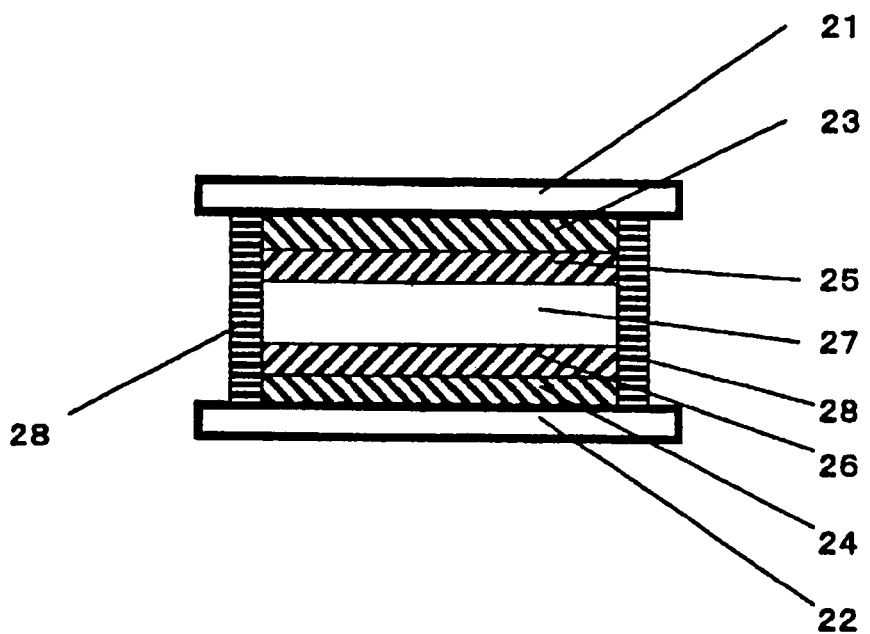
FIG. 2 is a schematic cross-sectional view of the screen according to an embodiment of the present invention.

FIG. 2 shows a schematic cross-sectional view of an example of the screen having such a structure. In FIG. 2, a pair of glass substrates 21 and 22 has confronting surfaces formed with transparent electrodes 23 and 24. The transparent electrodes have inner surfaces formed with alignment layers 25 and 26. The alignment layers 25 and 26 may be eliminated. Between the alignment layers 25 and 26 is sandwiched a liquid crystal layer 27, the thickness of which is determined by spacers not shown.

In general, the liquid crystal is configured so as to have a scattering/transmissive mode wherein when a voltage is applied across confronting electrodes, the liquid crystal exhibits a light transmissive state, and when no voltage is applied across confronting electrodes, the liquid crystal exhibits a light scattering state. The liquid crystal may be configured so as to exhibit the light scattering state at the time of application of a voltage and exhibit the light transmissive state at the time of non-application of a voltage. In the present invention, the latter configuration is preferable from the viewpoint that when the power is turned off to deenergize the image display, the screen can be transparent to prevent itself from being unpleasant to the eye or to minimize a feeling of oppression and be provided with a feeling of expanse. For this reason, explanation in the specification will be mainly made about the screen structure, which exhibits the light scattering state at the time of application of a voltage and exhibits the light transparent state at the time of application non-application of a voltage. However, a liquid crystal layer, which exhibits the reverse states, is also applicable to the present invention.

The liquid crystal layer of the screen fabricated as stated earlier can have the response speed between the light transmissive state and the light scattering state set at an extremely rapid rate of 3 ms or less in most of cases. Compared with the conventional scattering/transmissive mode, it is possible to obtain a significantly good transmissive state even when seeing the screen obliquely. For example, when one of the thermosetting compounds listed above is employed, it is possible to be almost free from haze even when seeing the screen which is slanted at an angle of 40 deg from a vertical position. In other words, the screen can have a good viewing angle dependency in the light transmissive state and can be configured so as to look like glass.

A commercially available projector or the like may be used as an image projecting unit. An example of the image projecting unit is a projector manufactured by EPSON Corp. (Model No. ELP-50). A liquid crystal projector employing a normal nematic liquid crystal, a projector using a digital micromirror device (DMD) manufactured by Texas Instrument Corp. and a projector employing LCOS (Liquid Crystal On Silicon) or a ferroelectric liquid crystal may be used. In the case of a still image, a slide projector may be used.

Figure 20:
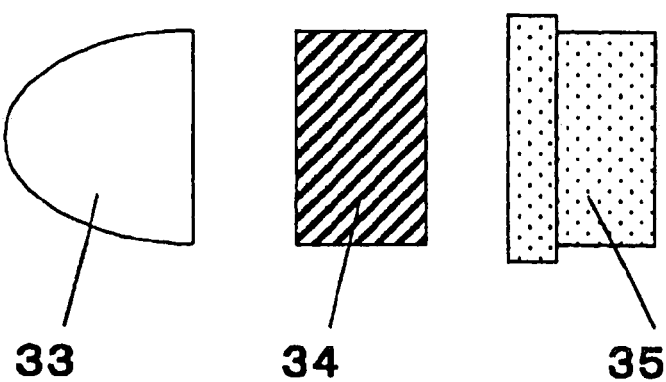
FIG. 20 is a schematic view showing a simple example of the basic structure of an image-projecting unit.

A simple example of the basic structure of the image-projecting unit is shown in FIG. 20. The image-projecting unit comprises three components of a lamp system 33, an image display portion 34 and a projection lens system 35. The lamp system 33 is preferably a light source providing uniform and parallel rays and may be combined with an integrator. When the image display portion 34 uses polarized light given from a liquid crystal or the like, a polarization converting element may be used for modification into linear polarized light. The image display portion 34 may be made of, e.g., a liquid crystal panel, a DMD, or LCOS. In order to display a full color image, there are, e.g., a method to split a light source into the three primary colors and to display an image with three liquid crystal panels, a method using a single liquid crystal panel having color filters, a field sequential color method wherein the color of a light source is sequentially switched. The projection lens system 35 may have a lens optimized in accordance with the size of the screen and the distance between the image projecting unit and the screen.

From the viewpoint of saving a space, it is preferable that the entire structure of the image projecting unit is smaller. For example, the image projecting unit is preferably formed as a mini projector having a compact design applied thereto. When the image projecting unit is formed as a mini projector, the image projecting unit can be convenient for a vehicle-borne product (e.g., an instrument panel, a car navigation system or an audio system), for a product in an office (e.g. a register) and for an amusement product (e.g., a pinball machine, a slot machine or a game machine) since a large space is not needed.

As the light source of the lamp system, e.g., a metal halide lamp, an extra-high pressure mercury lamp, a halogen lamp, a xenon lamp or an LED light source is applicable. When a color image is projected, a field sequential color method may be used. As the image projecting unit, a laser drawing device besides the projector may be used.

From the viewpoint that light projected on the screen is prevented from reaching a viewer, it is preferable that the image-projecting unit is configured so as to project light only when the liquid crystal layer in the screen exhibits the light scattering state. The screen according to the present invention may comprise a plurality of screens. In this case, it is preferable that the image-projecting unit projects an image on screens exhibiting the light scattering state, and that the image-projecting unit does not project an image when the liquid crystal layers of all screens exhibit the light transmissive state. This is because the light projected on the screens is prevented from reaching an viewer by configuring the image-projecting unit not so as to project an image when the liquid crystal layers of all screens exhibit the light transmissive state, and because the light scattering state of the liquid crystal layers in the screens and projection of an image can be properly synchronized in term of timing by configuring the image-projecting unit to project an image on a screen in the light scattering state.

It is preferable that the liquid crystal layers of all screens have time zones for the light transmissive state overlapping. This is because a scene behind the screens and an image on the screens can be simultaneously seen. The phrase "a scene behind the screens and an image on the screens can be simultaneously seen" means to cover both or either one of a first case wherein a scene behind the screens can be seen through an image on the screens, and a second case wherein a scene behind the screens can be seen through portions of the screens without an image projected thereon when seeing the image on the screens. In the first case, it is possible to produce an impression that the scene behind the screens and the image on the screens are simultaneously seen being overlapped. On the other hand, in the second case, it is possible to produce an impression that the image looks like floating in the air.

Figure 3:
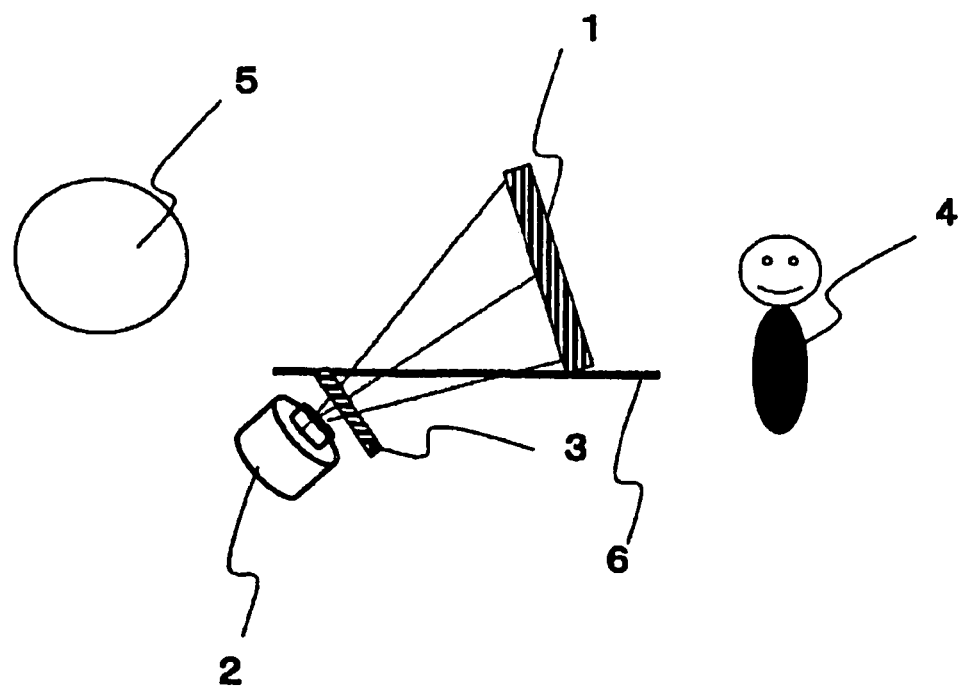
FIG. 3 is a schematic view showing an example of the arrangement of the image display system according to the present invention.

A method to set the projection by the image projecting unit as stated earlier will be explained, referring to FIG. 3. In FIG. 3, a screen 1 is provided between an image projecting unit 2 and a viewer 4. In the shown embodiment, By providing a shutter 3 between the image projecting unit 2 and the screen 1, and setting the shutter 3 so as to pass light therethrough only when the liquid crystal layer of the screen exhibits the light scattering state, an image projected from the image projecting unit is projected on the screen only when the liquid crystal layer of the screen exhibits the light scattering state. In other words, the timing of passing and blocking light by the shutter is synchronized with the driving timing, on which the light transmissive state and the light scattering state change each other in the liquid crystal layer of the screen. Although the viewer 4 can see a scene 5 behind the screen in the light transmissive state and see an image on the screen 1 in the light scattering state by this arrangement, the viewer can simultaneously see the scene 5 behind the screen and the image on the screen 1 as a composed afterimage since the light transmissive state and the light scattering state are switched. In this figure, a blind plate 6 is provided in order to prevent the image projecting unit from being directly visible to the viewer.

The repetition frequency of switching between the light transmissive state and the light scattering state has an effect on the flickering of an image on the screen. In other words, it is effective to increase the repetition frequency in order that the viewer is prevented from feeling that an image is flickering.

The temporal proportions of the light transmissive state and the light scattering state have an effect on which of a scene behind the screen and an image on the screen should be easier to be seen. In other words, when the light transmissive state has a greater temporal proportion, it is impossible or difficult to see an image on the screen, while it is possible to clearly see a scene behind the screen. As the temporal proportion of the light transmissive state gradually decreases, the image on the screen starts being vaguely visible at first, and the image is gradually clearly seen. On the other hand, the scene behind the screen, which has been clearly seen, starts being vaguely seen and is finally invisible.

By appropriately setting the proportions of a time period wherein the liquid crystal layer of the screen exhibits the light scattering state and a time period wherein the liquid crystal layer of the screen exhibits the light transmissive state, the viewer can simultaneously recognize an image on the screen and a scene behind the screen. In the case of using a plurality of screens, the proportions of the sum of time periods wherein at least one of the screens exhibits the light scattering state and a time period wherein the liquid crystal layers of all screens exhibit the light transmissive state may be set in one frame so that a viewer can simultaneously recognize an image on the screens and a scene behind the screens. When a scene behind the screen is difficult to be seen while an image on the screen can be clearly seen, it is effective to change the brightness of a projected image.

It is sufficient that the shutter is provided between the image projecting unit and the screen. The shutter may be provided on the image projecting unit or form a part of the image projecting unit.

The shutter needs to have rapid response. In order to cope with this requirement, e.g., a liquid crystal shutter may be used, instead of a general mechanical shutter. For example, a ferroelectric liquid crystal shutter or a shutter having a transmission/scattering type liquid crystal mode may be used. When a polarizer is used as the shutter, it is preferable from the viewpoint of increasing the usability of light that polarized light originating from light emitted from the image projecting unit is aligned with the transmission axis of the polarizer on the inlet side of the shutter. Without using the shutter, the timing of projecting an image from the image projecting unit may be directly synchronized with the driving timing, on which the light transmissive state and the light scattering state change each other in the liquid crystal layer of the screen. In the case of a liquid crystal projector or a DMD projector, a light source may be turned on and off without using the shutter. As the light source in this case, a fast switching LED may be used.

The driving timing, on which the liquid crystal layer of the screen exhibits the light transmissive state or the light scattering state with respect to incident light, will be explained, referring to FIG. 4. For example, a voltage is applied across confronting electrodes of the screen to subject the liquid crystal to an electric field so as to change the liquid crystal layer from the light transmissive state to the light scattering state, and an image is projected on the screen by the image projecting unit in synchronization with the change to the light scattering state, referring to FIG. 4. Then, the application of the voltage across the confronting electrodes of the screen is stopped to eliminate the electric field from the liquid crystal layer so as to change the liquid layer from the light scattering state to the light transmissive state, and the projection of the image by the image projecting unit is turned off in synchronization with the change to the light transmissive state. By repeating this operation, only when the liquid crystal layer of the screen exhibits the light scattering state, an image is projected, and the viewer can see a scattered image on the screen.

By repeating the light transmissive state and the light scattering state stated earlier, the viewer can simultaneously recognize two of an image on the screen and a scene behind the screen.

When the screen has a sufficient scattering property, light is scattered in all directions. As a result, the viewer can seen an image on the screen from various directions, such as the side of the image projecting unit, a side opposite to the image projecting unit side, and a position oblique thereto. However, it is preferable that the image-projecting unit is provided at a side opposite to the viewer with respect to the screen. This is because when the liquid crystal layer according to the present invention is used, the proportion of the backward scattering of light (the proportion of light that is scattered toward the image projecting unit side with respect to the screen) is lower than the proportion of the forward scattering of light (the proportion of light that is scattered toward the side opposite to the image projecting unit side with respect to the screen) in many cases.

In the image display system according to the present invention, it is required that the repetition frequency of a combination of the light transmissive state and the light scattering state as a minimum repetitive unit can be set at a value in such a range that the viewer cannot recognize the flickering of an image on the screen, and that the proportions of the sum $T_1$ of the time periods wherein at least one of the screens exhibits the light scattering state and the time period $T_2$ wherein the liquid crystal layers of all screens exhibit the light transmissive state be set in one frame so that the viewer can simultaneously recognize an image on the screens and a scene behind the screens.

One frame includes the light scattering state and the light transmissive state of the liquid crystal layers of the screens. When an image is projected on a screen exhibiting the light scattering state, there are the time periods $T_1$ for seeing the image and the time period $T_2$ for seeing the scene behind the screens to the viewer. However, by setting the conditions as stated earlier, the viewer can simultaneously see the image and the scene behind the screens without recognizing the flicking of the image.

In general, when the repetition frequency of one frame is set at 30 Hz or higher, the flickering of an image, which is caused by an afterimage effect, can be prevented from bothering the viewer. The repetition frequency of one frame is preferably set as 50 Hz or higher since no flickering bothers the viewer. The repetition frequency of one frame is more preferably set as 70 Hz or higher. Although there is no upper limit, the repetition frequency is preferably set as 1 kHz or lower. A value of 1 kHz or higher is too fast for the screens to respond and increases the amount of consumed electricity.

Figure 4:
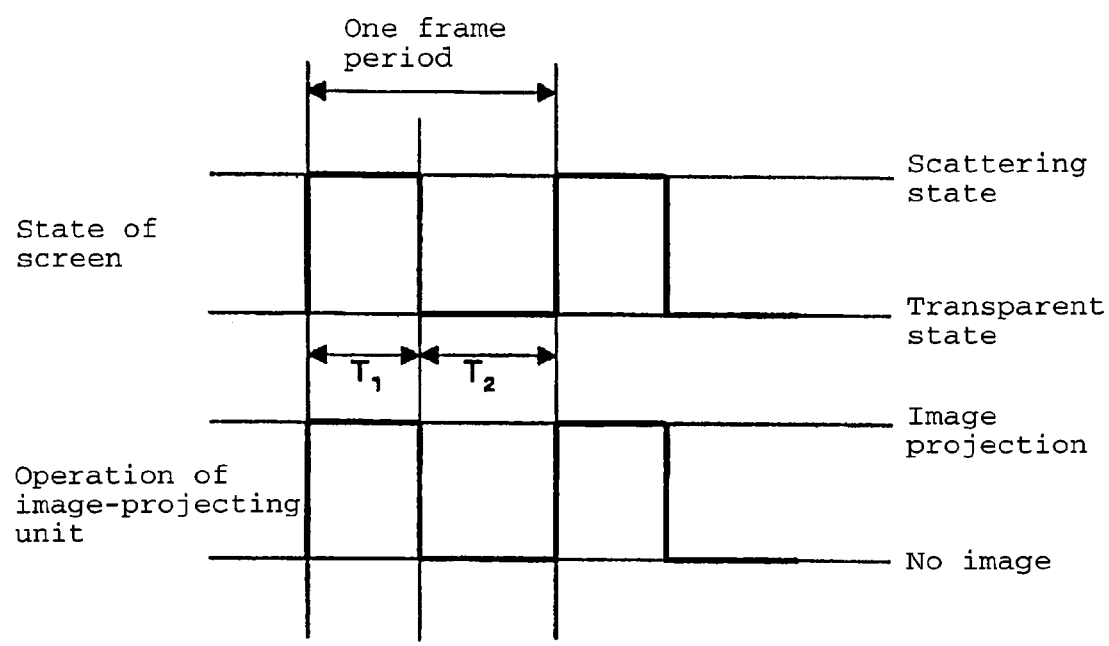
FIG. 4 is a drive timing chart for exhibiting a light transmissive state and a light scattering state in the example shown in FIG. 3.

The frame comprises the minimum repetitive unit of a combination of the light scattering state and the light transmissive state, and the frame includes the sum of $T_1$ and $T_2$ in the case shown in FIG. 4.

The screen according to the present invention may include a plurality of screens. In the case of using a plurality of screens, what is important is that the sum $T_1$ of the time periods wherein at least one of the screens exhibits the light scattering state and the time period $T_2$ wherein the liquid crystal layers of all screens exhibit the light transmissivestate are set so as to meet the relationship of $T_1/(T_1+T_2) \leq 0.8$ in one frame. This is because when the relationship of $T_1/(T_1+T_2) \leq 0.8$ is met, the viewer can simultaneously see the scene behind the screens as well. There is no particular limitation to the lower limit of the relationship of $T_1/(T_1+T_2)$. However, when the lower limit is too small, it is difficult to see an image projected on the screens in some cases. In all cases except for utilization of a subliminal image, it is preferable to meet the relationship of $0.01 < T_1/(T_1+T_2)$.

The ratio of $T_1/(T_1+T_2)$ is determined, depending on whether seeing an image projected on a screen has priority or seeing a scene behind a screen has priority. For example, in the case of a vehicle-borne head-up display, it is preferable from the viewpoint of giving priority to seeing a scene behind a screen that the relationship of $T_1/(T_1+T_2) \leq 0.5$ is met, wherein the transparency increases to make a scene behind the screen clearer. The ratio may be varied. In some cases, it is effective that the ratio is set so as to meet the relationship of $T_1/(T_1+T_2)=0.7$ when a car is stopped, and the ratio is set so as to meet the relationship of $T_1/(T_1+T_2)=0.3$ when the car is running, for instance. When the amount of light emitted from the image projecting unit is large, the ratio may be set so as to meet the relationship of $T_1/(T_1+T_2)=0.1$. In this case, the time period wherein a screen exhibits the light scattering state becomes shorter. However, the viewer can recognize an image since the amount of light is larger, and the viewer sees as if the image is floating in the air since he or she can see a scene behind the screen in an almost normal way.

When the system includes a plurality of screens capable of repeating the light transmissive state and the light scattering state, it is preferable that the screens are provided, being overlapped. The degree of overlapping or the distance between adjacent screens may be arbitrarily selected according to applications. For example, when an attempt is made to give the viewer an impression that he or she moves deeply in the depth direction in a space, it is preferable that the distance between adjacent screens is large.

The driving timing, on which the liquid crystal layers of the screens change between the light transmissive state and the light scattering state in this case, will be explained, referring to FIG. 5 and FIG. 6. When the system includes three or more of screens, similar consideration may be applied.

Figure 5:
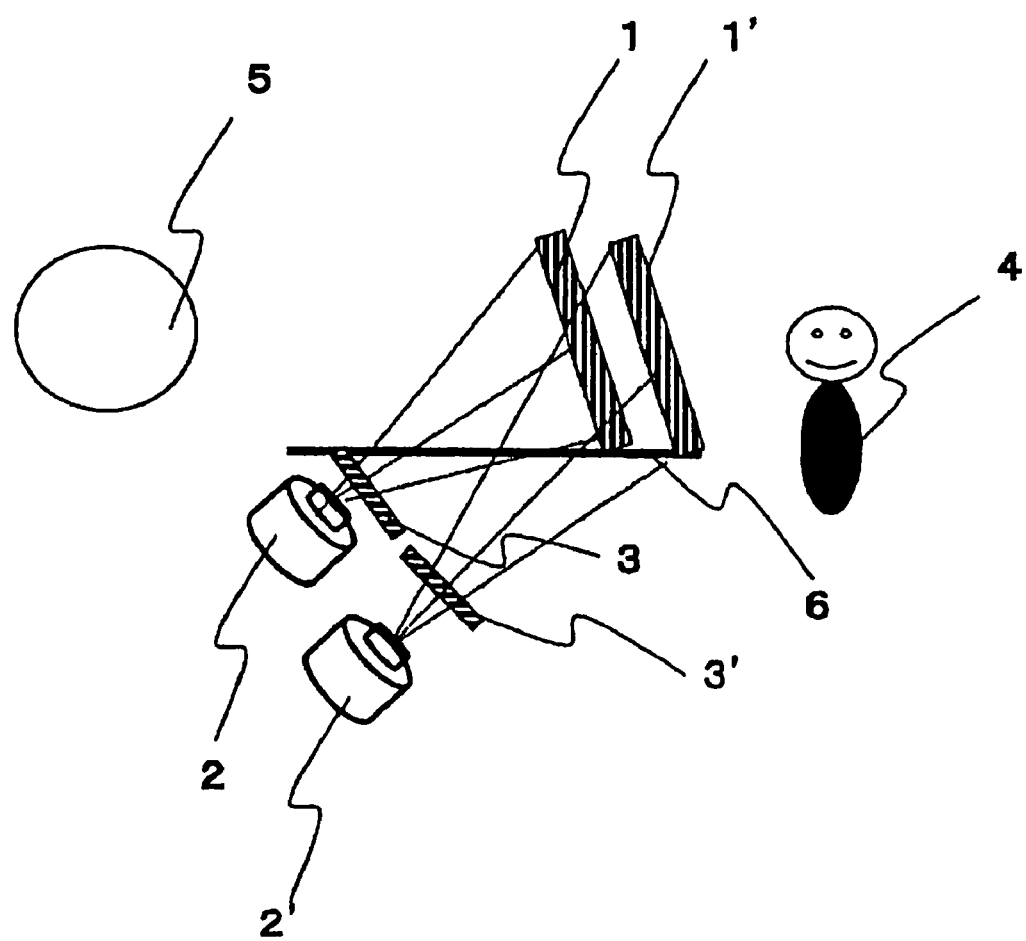
FIG. 5 is a schematic view showing another example of the arrangement of the image display system according to the present invention.

In the embodiment shown in FIG. 5, which is different from the embodiment shown in FIG. 3, there are provided two image-projecting units 2 and 2', two shutters 3 and 3', and two screens 1 and 1' between a viewer 4 and the shutters.

Figure 6:
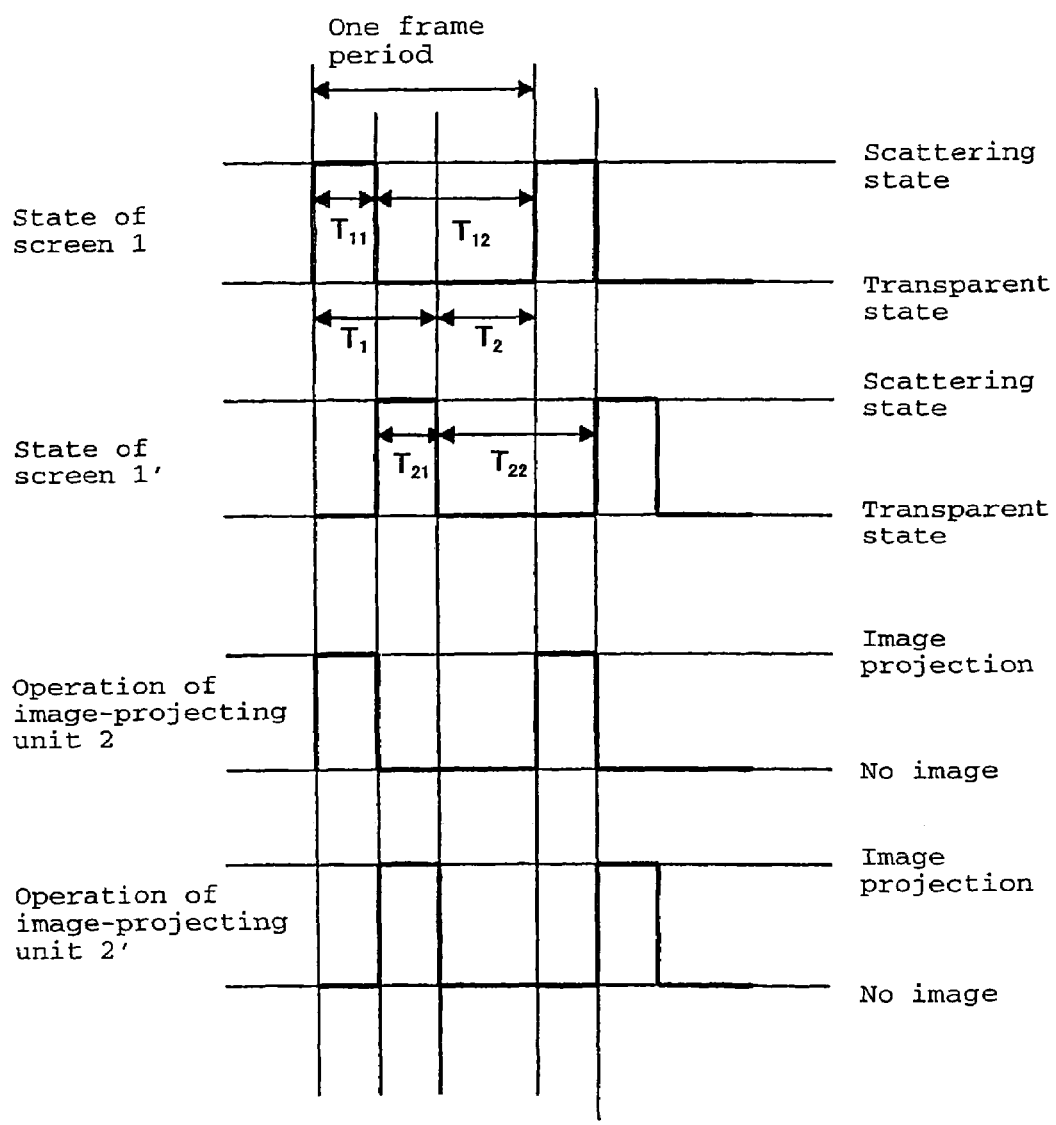
FIG. 6 is a drive timing chart for exhibiting the light transmissive state and the light scattering state in the example shown in FIG. 5.

In this arrangement, the driving timing, on which the liquid crystal layers of the screens change between the light transmissive state and the light scattering state, may be set as shown in FIG. 6, for instance. The light transmissive state and the light scattering state are shown in the same way as in the embodiment shown in FIG. 3. In the case of the timing chart shown in FIG. 6, when the liquid crystal layer of the screen 1 exhibits the light scattering state, there is only a time period where the liquid crystal layer of the screen 1' exhibits the light transmissive state, while when the liquid crystal layer of the screen 1 exhibits the light transmissive state, there are a time period wherein the liquid crystal layer of the screen 1' exhibits the light scattering state and a time period wherein the liquid crystal layer of the screen 1' exhibits the light transmissive state.

When the liquid crystal layer of the screen 1 exhibits the light scattering state, an image may be projected on the screen 1 without being projected on the screen 1'. In this case, the viewer sees the image on the screen 1 through the screen 1' since the liquid crystal layer of the screen 1' exhibits the light transmissive state.

When the liquid crystal layer of the screen 1 exhibits the light transmissive state, an image may be projected on the screen 1' through the screen 1 as long as the liquid crystal layer of the screen 1' exhibits the light scattering state. Thus, the viewer can see the image on the screen 1'.

When the liquid crystal layer of the screen 1 exhibits the light transmissive state, no image is projected on the screen 1 or screen 1' as long as the liquid crystal layer of the screen 1' exhibits the light transmissive state. Thus, the viewer can see a scene 5 on the side of the image projecting units 2 and 2' through the screens 1 and 1'.

By repeating the timing chart of the change between the light transmissive state and the light scattering state, the viewer can simultaneously recognize three of an image on the screen 1, an image on the screen 1' and the scene 5 behind the screens. When both images are seen as being overlapped, both images can be simultaneously seen without one of the images being concealed by the other image.

Although the image on the screen 1 and the image on the screen 1' may be projected by the two image projecting units as stated earlier, the image on the screen 1 and the image on the screen 1' may be projected by a single image projecting unit. In order to make the images on the screens clear in the latter arrangement, the focus of the image projecting unit is required to be changed according to the distance between the screens in some cases. When a single image is displayed on the screen 1 and the screen 1', it becomes possible to obtain an image wherein the image comes and goes between the screen 1 and the screen 1'. $T_{11}/T_{12}$ and $T_{21}/T_{22}$ as temporal ratios of the light scattering state to the light transmissive state may be the same as or different from each other.

Figure 7:
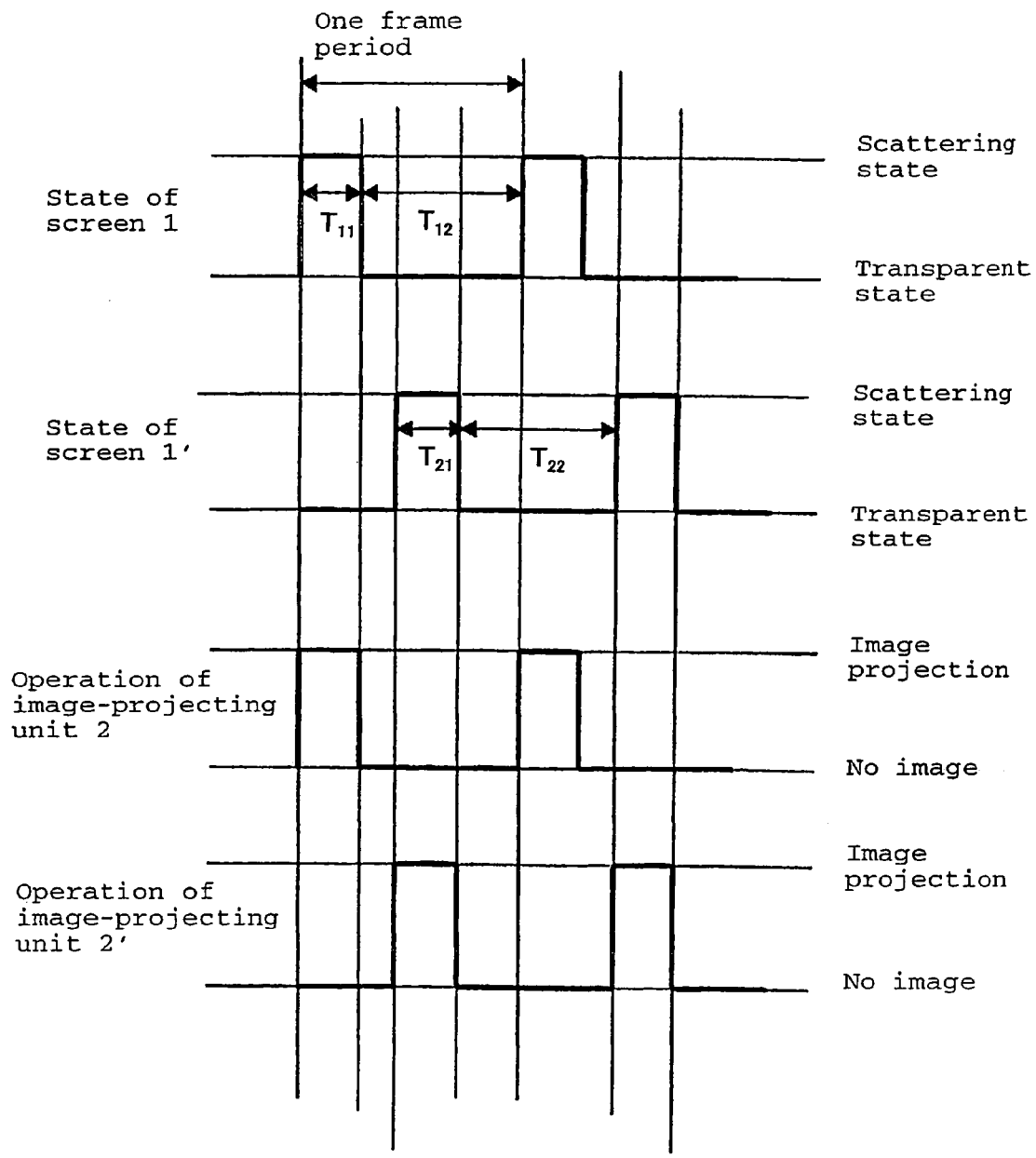
FIG. 7 is another drive timing chart for exhibiting the light transmissive state and the light scattering state in the example shown in FIG. 5.

The opening timing of $T_{21}$ is not always set immediately after $T_{11}$ as shown in FIG. 6. An example wherein the opening timing of $T_{21}$ is not set immediately after $T_{11}$ is shown in FIG. 7. As shown in FIG. 6, $T_{11}$ and $T_{22}$ may be timewise overlapped, $T_{21}$ and $T_{12}$ may be timewise overlapped, and $T_{12}$ and $T_{22}$ may be timewise overlapped. However, $T_{11}$ and $T_{21}$ should be not overlapped in many cases. This is because, in the case of the screens being overlapped, an image cannot be projected on a desired screen in some cases.

Although the frame is normally repeated in the same cycle, the cycle may be changed occasionally according to cases.

In each of the cases, the light passing period and the light blocking period by the shutters 3 and 3' should be synchronized with the time periods $T_{11}$ and $T_{12}$ and the time periods $T_{21}$ and $T_{22}$, as the driving periods wherein the screens 1 and 1' exhibit the light scattering state and the light transmissive state as shown in FIGS. 6 and 7.

A similar operation can be performed even when the system includes three or more of screens in an overlapping fashion. In such a case, it is possible to obtain a wide variety of image representations, such an image representation with an image moving back and forth, horizontally, vertically and obliquely. When the number of screens exhibiting the light scattering state is smaller than the number of all screens by one or more in one frame in the case of provision of two or more screens in an overlapping fashion, it is possible to obtain a wide variety of image representations or an image representation with high brightness maintained as stated later with respect to Example 5.

Figure 10:
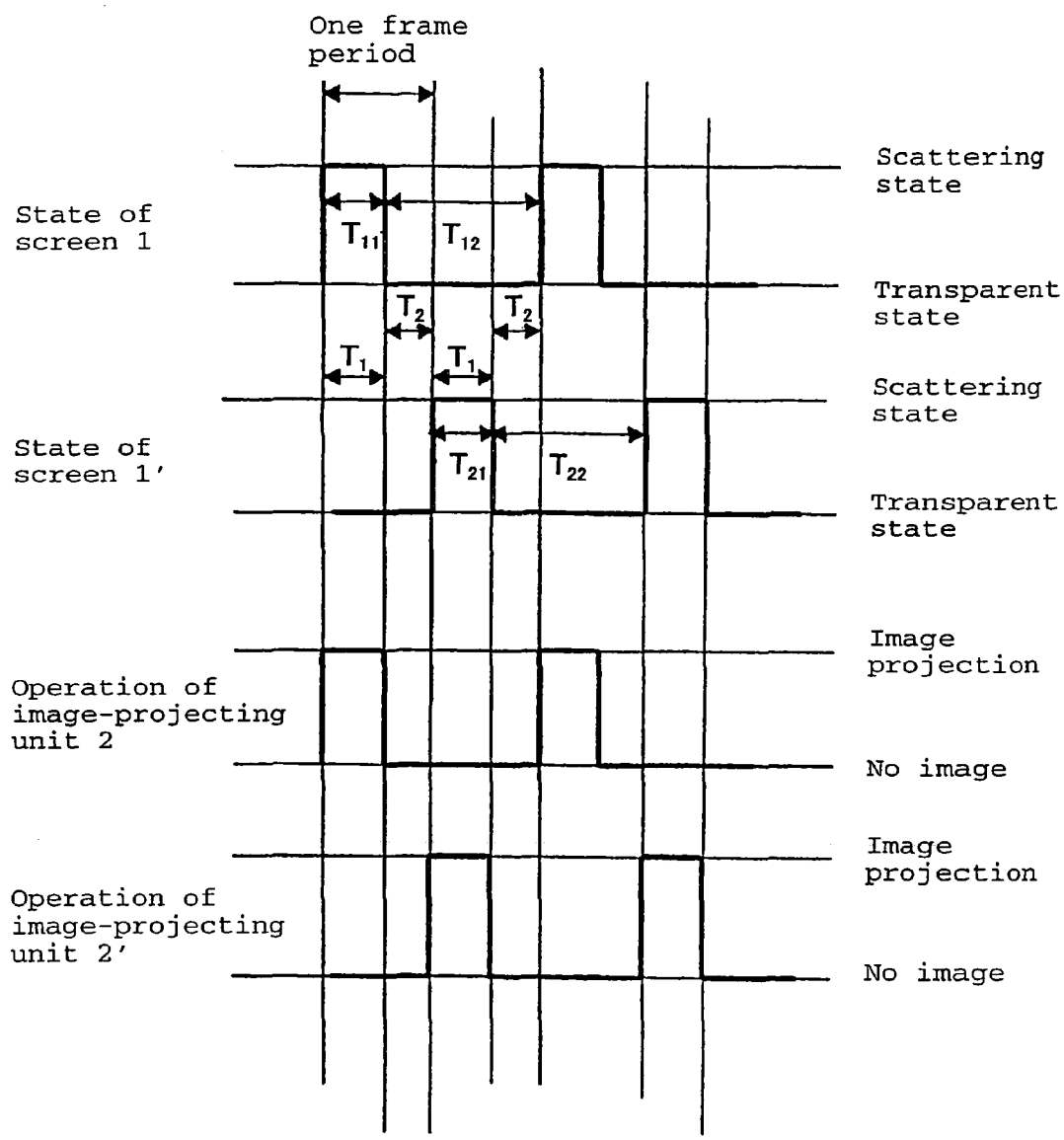
FIG. 10 is another drive timing chart for exhibiting the light transmissive state and the light scattering state in the example shown in FIG. 5.

With respect to $T_1$ and $T_2$ in the relationship of $T_1/(T_1+T_2)$ in the case of the system including a plurality of screens, the sum of the time periods wherein at least one screen exhibits the light scattering state is defined as $T_1$, and the sum of the time periods wherein all screens exhibit the light transmissive state is defined as $T_2$. For example, in the embodiment shown in FIG. 6, $T_1$ and $T_2$ shown in this figure are applied. In the embodiment shown in FIG. 7, $T_{12}+T_{21}$ is applied to $T_1$, and $T_{12}-T_{21}$ is applied to $T_2$. When $T_{11}$ has the same width as $T_{21}$, $T_{12}$ has the same width as $T_{22}$, and $T_{21}$ is located in a central portion of $T_{12}$ as shown in FIG. 10, $T_1$ and $T_2$ have lengths shown in this figure, respectively. This is because the sum of $T_{11}+T_{21}$ and $T_{12}-T_{21}$ is the length of two cycles in this case.

The switching between the scattering state and the transparent state will be explained in more detail. The screen according to the present invention is normally configured so that the screen does not instantly switch between the scattering state and the transparent state when a driving voltage is changed and that the screen exhibits transition states according to the response speed of switching between the scattering state and the transparent state.

Figure 11:
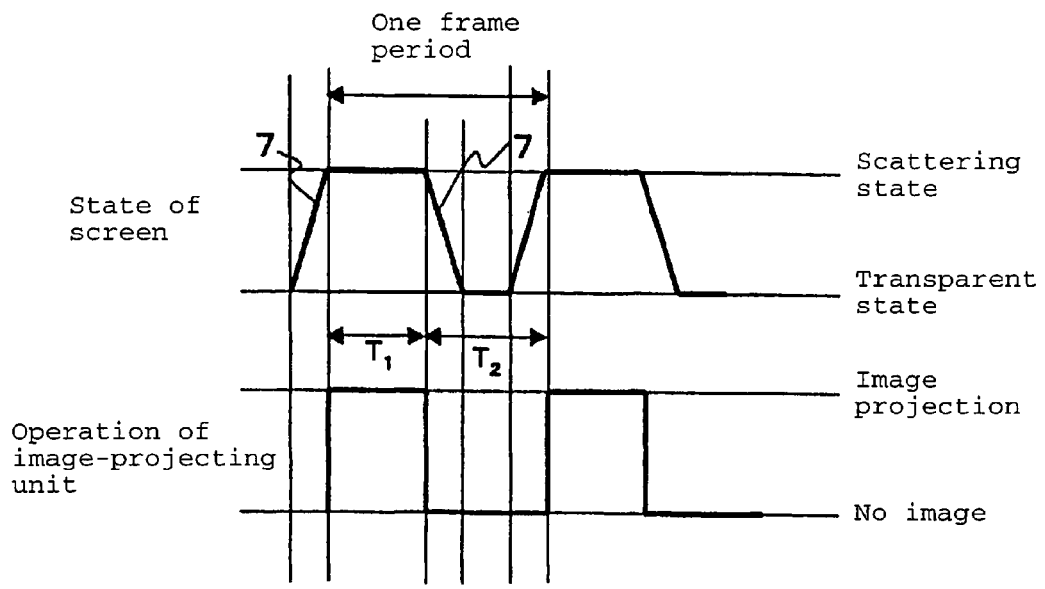
FIG. 11 is a schematic view showing an example of transition states in the drive timing chart shown in FIG. 4.
Figure 12:
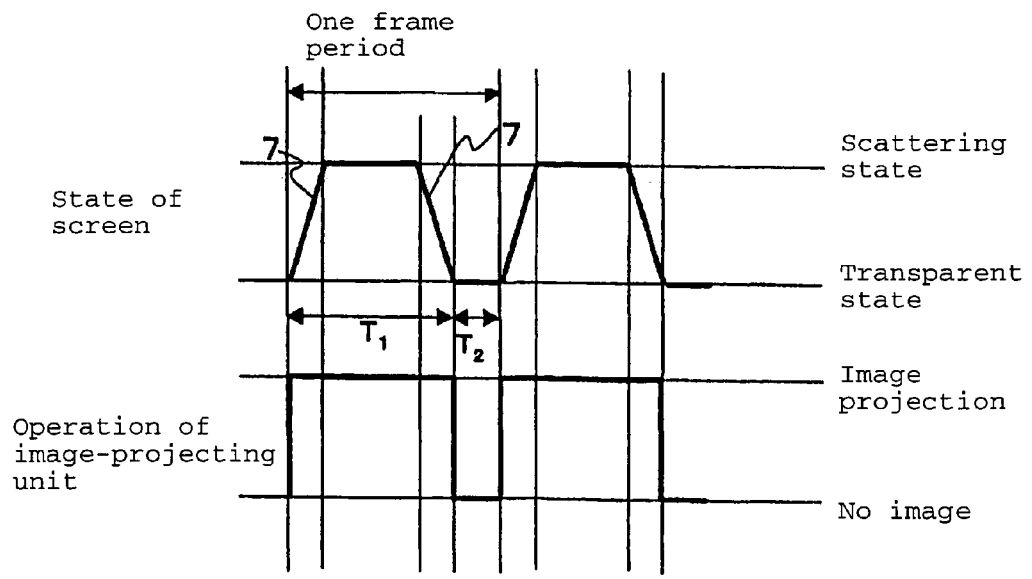
FIG. 12 is a schematic view showing another example of the transition states in the drive timing chart shown in FIG. 4.

For example, in the switching between the scattering state and the transparent state of the screen shown in FIG. 4, the transition states of a rise time and a fall time are shown as in FIGS. 11 and 12. In the switching between the scattering state and the transparent state of the screens shown in FIG. 6, the transition states of a rise time and a fall time are shown as in FIG. 13. The transition states 7 indicated by oblique lines in FIGS. 11, 12 and 13 are shown as being significantly timewise enlarged in comparison with other portions.

In such cases, it is preferable that when the screen has gone through a transition state and has exhibited almost 100% of the scattering state, the projection by the image-projecting unit is performed, and that when the scattering state changes into a transition state leading to the transparent state, the projection by the image-projecting unit is stopped. This is because this operation allows light projected by the image-projecting unit to be scattered by the screen, which is in such a state so as to scatter light most strongly. Although the projection may be performed as the timing chart shown in FIG. 12, it is preferable that the projection is performed as the timing chart shown in FIG. 11. This is because the proportion of light projected directly to a viewer increases in the transition states to make him or her feel dazzling. In the case of provision of two or more of screens, the operation is performed according to the timing chart shown in FIG. 13.

Figure 13:
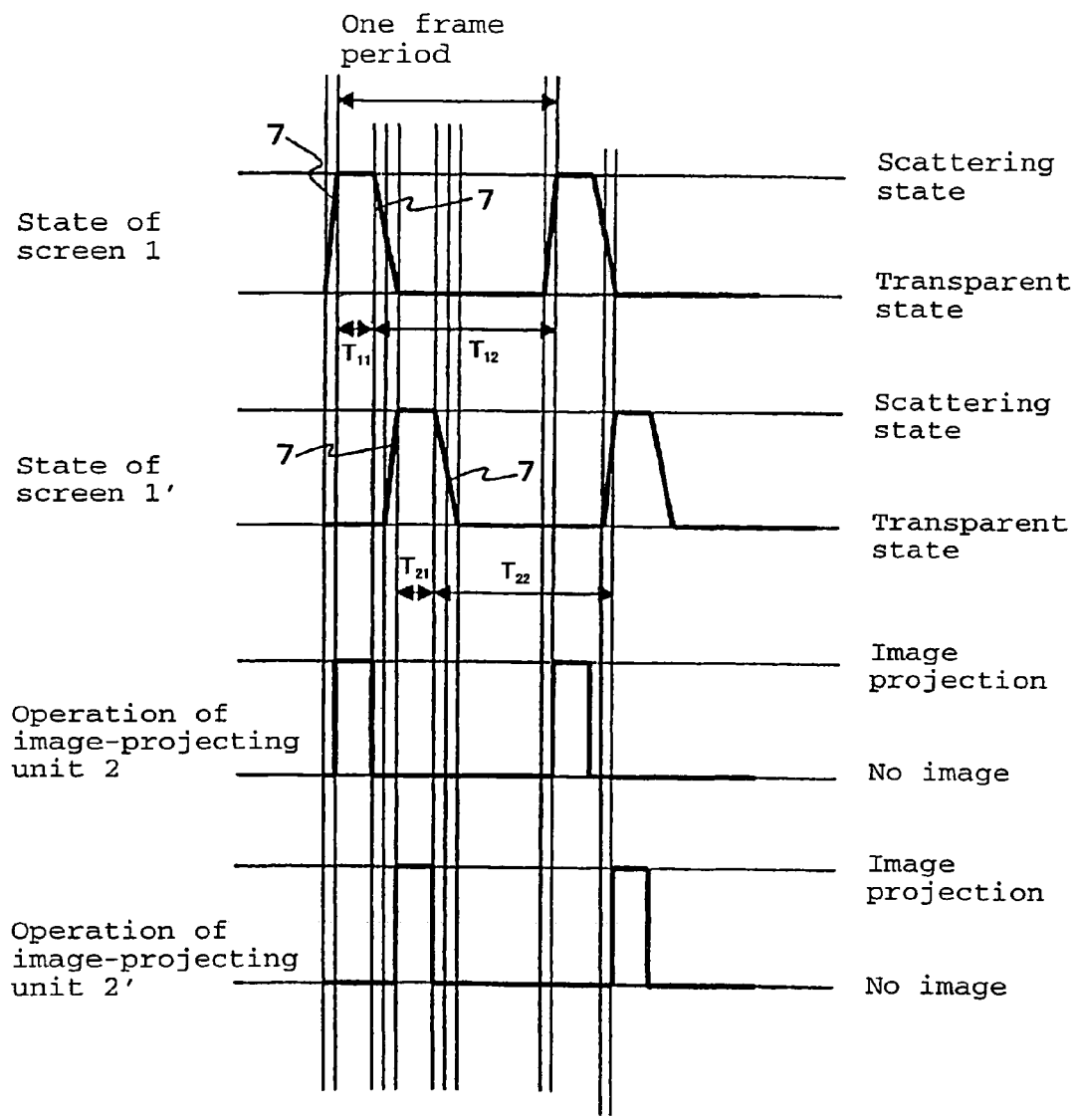
FIG. 13 is a schematic view showing an example of transition states in the drive timing chart shown in FIG. 6.

In the case of the timing chart shown in FIG. 11 or 13, a screen, which exhibits a transition state, may be considered as being in the transparent state. In other words, it is possible to adopt an operating method wherein the time period of the fall time required for a screen to change from the scattering state into a transition state leading to the transparent state, and the time period of the rise time required for another screen to change from the transparent state into a transition state leading to the scattering state are overlapped. When the rise time and the fall time are substantially simultaneous, it is easy to obtain a screen having a bright image or high transparency since it is possible to utilize the time more effectively.

Whether the transition states are regarded as the light scattering state or the light transmissive state may be determined according to circumstances. However, when it is demanded that the time that can be regarded as the light transmissive state be ensured longer, it is preferable that the transition states are regarded as the light transmissive state. $T_1$ and $T_2$ according to the present invention are applicable regardless of whether the transition states are regarded as the light scattering state or the light transmissive state.

The image display system according to the present invention can display various images, such as a still image looking like floating in a scene therebehind, an image moving back and forth, horizontally, vertically and obliquely, and a moving image looking like floating in a scene, by repeating the timing chart including the light transmissive state and the light scattering state as stated earlier. The image display system according to the present invention can also display a plurality of images, a kind of three-dimensional image representation provided by making a switch between images displayed on overlapping screens, or the like.

It is preferable from the viewpoint of preventing the appearance of the system from being ugly that the image projecting unit or the shutter is provided so as to prevent a viewer from seeing it. This can be realized by obliquely projecting an image to a screen surface or providing a blind plate.

Figure 8:
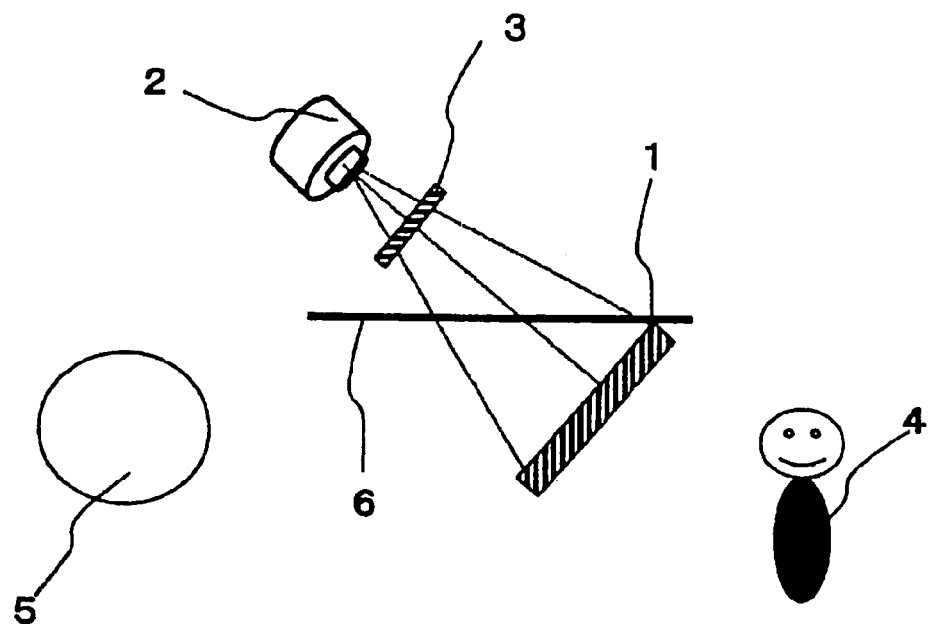
FIG. 8 is a schematic view showing another example of the arrangement of the image display system according to the present invention.

The embodiments shown in FIG. 3 and FIG. 5 are designed for such an arrangement. Specifically, the screens 1 and 1' are provided obliquely to the viewer, and the blind plate 6 is provided, as required, to prevent the viewer from seeing the image-projection unit(s) or the shutter(s) as shown in FIG. 3 and FIG. 5. Although the image-projection unit(s) and the shutter(s) are provided on a lower side with respect to the viewer in the embodiments shown in FIGS. 3 and 5, the image-projection unit(s) and the shutter(s) may be provided on an upper side as shown in FIG. 8 or be provided on either one of right and left sides. Although an image is seen as being normally deformed when being projected in that way, the deformation can be suppressed by modifying the original of the image to be projected or using a correcting lens. When it is acceptable for the image-projecting unit(s) or the shutter(s) to be visible to a viewer, this arrangement is not necessary.

In many cases, the screen preferably has a transparent peripheral portion since it is possible to display, in an emphasized fashion, an image, which looks like floating in a scene behind. In order to attain this purpose, it is preferable that the peripheral portion of the screen is sealed with a transparent resin layer, or that when a frame is provided on the peripheral portion, the frame is made of a transparent material. In many cases, it is sufficient that the peripheral portion of the screen is transparent in a main part. For example, as long as the peripheral portion except for a connection part with an external circuit is transparent, it is possible to display, in a significantly emphasized fashion, an image, which looks like floating in a scene behind.

Any kind of known sealant is applicable as long as it is a resin having high transparency. By using a resin having high transparency, the screen can have high transparency in the entirety, and it is possible to display, in a significantly emphasized fashion, an image, which looks like floating in a scene therebehind. For example, when glass substrates are used, an epoxy resin or an acrylic resin, which has a refractive index close to that of glass, can be used to display an image, wherein transparent glass looks like floating in the air.

Any size of screen, which has a diagonal length of about 10 cm to about 3 m, is applicable. However, generally speaking, a larger size of screen is more preferable than a small size of screen in many cases from the viewpoint that a viewer can enjoy a powerful image. Plural screens may be joined together to make up a large size of screen.

When plural screens are joined together, it is preferable that the liquid crystal layers are joined together at the joined edges so as to display an image in a substantially continuous fashion. When liquid crystal layers are overlapped at joined edges, an image could be displayed, being partly different in brightness, which is not preferable.

Conversely, when the peripheral portions of screens form the joined edges by seals or frames, the light transmissive state and the light scattering state cannot be switched in the joined edges. As a result, when the seals or the frames are made of a transparent material, there is caused a problem that an image is not displayed on the joined edges, and the image is partly discontinuous.

In some cases, it is effective that the joined edges are not transparent, and each of the joined edges has a portion or the entire portion formed in the light scattering state so as to have a scattering property equal to the screen. This is because an image can be displayed without being discontinuous, or because even when an image contains a discontinuous portion, the image can be displayed with the discontinuous portion being minimized. In this case, although the joined edges stay in the light scattering state even when the liquid layers of all screens have exhibited the light transmissive state, this situation is not minimally uncomfortable to a viewer.

Although explanation of the present invention has been made mainly about a case wherein the liquid crystal layers of all screens have the time zones of the light transmissive state in an overlapping fashion, this condition is not indispensable to the present invention. When a plurality of screens are provided, and when all liquid crystal layers do not have the time zones of the light transmissive state in an overlapping fashion, it becomes difficult for a viewer to simultaneously see an image on the screens and a scene behind the screens in an overlapping fashion, and portions of the screens without an image being projected look like bears creamy white when the viewer sees the image on the screens. However, the viewer can have an impression that the image looks like floating in the air as a whole, which can attain some of the objects of the present invention.

For example, an image display system, which includes at least one screen capable of repeatedly exhibiting the light transmissive state and the light scattering state and an image-projecting unit for projecting an image on the screen, wherein the screen comprises a liquid crystal layer made of a liquid crystal and a cured resin having a mesogen structure, the liquid crystal layer including liquid crystal molecules having a pretilt angle of 60 deg or more with respect to a substrate surface, and a pair of substrates with transparent electrodes provided to sandwich the liquid crystal layer therebetween; the screen is configured so that when a voltage is applied across confronting electrodes, the liquid crystal layer exhibits the light scattering state, and that when no voltage is applied across confronting electrodes, the liquid crystal layer exhibits the light transmissive state; the image-projecting unit is configured so as to project an image on the screen exhibiting the light scattering state; and the repetition frequency of a combination of the light transmissive state and the light scattering state as a minimum repetitive unit can be set at a value in such a range that a viewer cannot recognize the flickering of the image on the screen; and an image display system wherein the repetition frequency can be set at 30 Hz or higher are included in one of the modes of the present invention.

The modes of the present invention, which have been explained in the case wherein the liquid crystal layers of all screens have the time zones of the light transmissive state in an overlapping fashion, can be carried out, in some cases, even a case wherein all liquid crystal layers do not have the time zones of the light transmissive state in an overlapping fashion.

Figure 14:
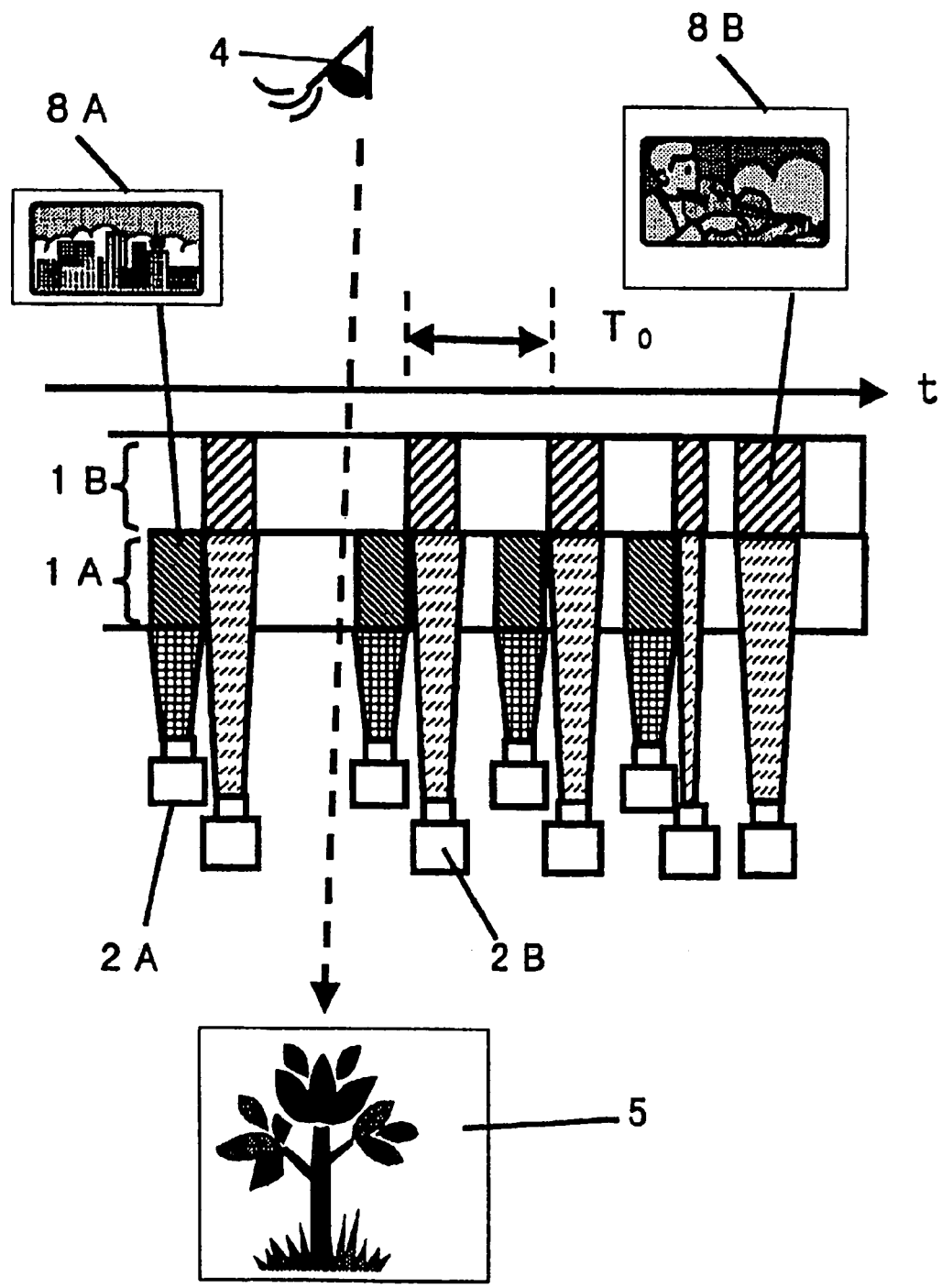
FIG. 14 is a schematic view showing the structural example of an embodiment of the present invention.

FIG. 14 schematically shows another embodiment of the present invention. In this embodiment, there are provided two screens and two image-projecting units. A screen 1B is provided on the side of a viewer 4, and a screen 1A is provided on the side of the image projecting units (the side opposite to the viewer side).

It is shown that a process wherein each of the image-projecting units projects an image on its related screen is sampled and that the respective samples are sequentially placed in chronological order. In this figure, it is shown that the process proceeds from left to right.

When the liquid crystal layers of all screens exhibits the light transmissive state, the image-projecting units project no image. At this time, the viewer 4 can see a scene 5 behind the screens.

The system according to this embodiment is configured so that the projection image projected from an image projecting unit 2A is focused on the liquid crystal layer of the screen 1A exhibiting the light scattering state and is displayed as an image 8A.

The projection image projected from the other image projecting unit 2B passes through the liquid crystal layer of the screen 1A, is focused on the liquid crystal layer of the screen 1B and is displayed as an image 8B when the liquid crystal layer of the screen 1A of the two screens exhibits the light transmissive state.

Thus, the viewer 4 can see all of the image 8A, the image 8B and the scene 5. The image 8A and the image 8B are the projection images, each of which can be displayed as a still image and/or a moving image.

The operating sequence is determined so that the repetition frequency of a basic combination of the light transmissive state and the light scattering state as a minimum repetitive unit (corresponding to a time section indicated by $T_0$ in this figure) can be set, in a frame period, at a value in such a range that the viewer can not recognize the flickering of the image on each of screens. The driving timing is set so that a screen displays its projection image thereon when the liquid crystal layer of the screen exhibits the light scattering state.

When the projection time is short, an adjustment is made so that the viewer can sufficiently see projection images by increasing the brightness of the projection images. The combination of the light scattering state and the light transmissive state may be set in an appropriate time section, and the time section may be changed at random. The repetitive frequency may be set as being constant as in examples stated later. One of the screens may be intermittently activated to stop the display of an image for a certain time period.

By combining projection images on a plurality of screens, the system may display a projection image, which makes a three-dimensional movement in the depth of the screens.

The image display system according to the present invention may be used as a vehicle-borne head-up display, a sales promotion equipment in a shop, such as a show window, an information display provided near to the reception desk in an office room, a factory or an exhibition hall, an information display provided near to a cash register in a convenience store, the information display for an arcade game machine or the like, allowing a viewer to enjoy a unique image.

The screen according to the present invention may have a portion provided with a function of capable of sequentially displaying images, such as displaying times, by using the liquid crystal layer and paired transparent electrodes. The screen may also have a portion provided with the function of another type of liquid crystal display, such a reflective liquid crystal display. For example, the screen may have a lower portion formed with patterned electrodes so as to display an image by causing scattering in a desired portion.

The screen according to the present invention may be provided on or above another display since the screen can be made transparent. For example, the screen may be provided before a vehicle-borne instrument panel or another instrument. In other words, the system may be used with an instrument, an information display or a mirror being provided behind the screen.

The screen may be used as a single screen, be divided into sections or be divided and formed into a plurality of shapes. The screen may have a plurality of patterned screens layered therein.

The plural screens may have a scattering screen changing with lapse of time to provide a viewer with a notice, which looks like flickering.

It is preferable from the viewpoint of increasing impact resistance that the upper and lower substrates are fixed. For example, the upper and lower substrates may be fixed by using adhesive spacers. It is preferable that the adhesive spacers are made of a material having high transparency.

A portion of the screen that is not required to display an image in a scattered fashion in use may be filled with an adhesive resin in the entirety. Even in a portion of the screen that is required to display an image in a scattered fashion, the scattering property may be controlled by adjusting the area occupied by adhesive spacers. This is an effective method particularly when a scene behind the screen is required to be visible to some extent.

EXAMPLE

Now, examples of the present invention will be described. In explanation of the examples, the phrase "part" and "parts" means "part by weight" and "parts by weight", respectively.

Example 1

A screen, which has a cross-sectional shape schematically shown in FIG. 2, was fabricated as follows: First, 80 parts of a nematic liquid crystal having a negative dielectric anisotropy (AG-1016XX, manufactured by Chisso Corporation), 20 parts of a curable compound represented by the formula (a) in FIG. 1, and 0.2 part of benzoin isopropyl ether were blended to prepare a mixed composition.

Next, a pair of glass substrates, which had polyimide films for vertical alignment (JALS-682-R3, manufactured by JSR Corporation) formed on transparent electrodes and had a length of 200 mm, a width of 200 mm and a thickness of 1.1 mm, were provided so that the polyimide films faced each other. After a very small amount of resin beads having a diameter of 6 μm were sprayed in the gap between the polyimide films, the substrates were bonded by an epoxy resin printed in a width of about 1 mm along the four sides of a substrate, and the epoxy resin was cured. Thus, the screen was prepared so as to have a peripheral portion sealed with a transparent resin layer. Specifically, a portion of the transparent sealing layer was previously cut away, and the mixed composition was injected through the cut portion into the liquid crystal cell thus fabricated, after the sealing layer was cured. Then, the cut portion of the sealing layer was sealed with an epoxy resin, and the epoxy resin was cured, completing the sealing layer 28 shown in FIG. 2. Next, the curable compound was cured to form the liquid crystal layer while the liquid crystal with the curable compound dissolved therein had alignment maintained in a direction perpendicular to the substrate surfaces under the action of the polyimide films for vertical alignment. Specifically, while the injected liquid crystal cell was maintained at 40° C., ultraviolet rays of about 2.5 mW/cm² from the upper side and ultraviolet rays of about 2.5 mW/cm² from the lower side were irradiated for 10 min by a Hg—Xe lamp having a main wavelength of about 365 nm, to fabricate the screen, which was sealed with the transparent resin layer.

Figure 21:
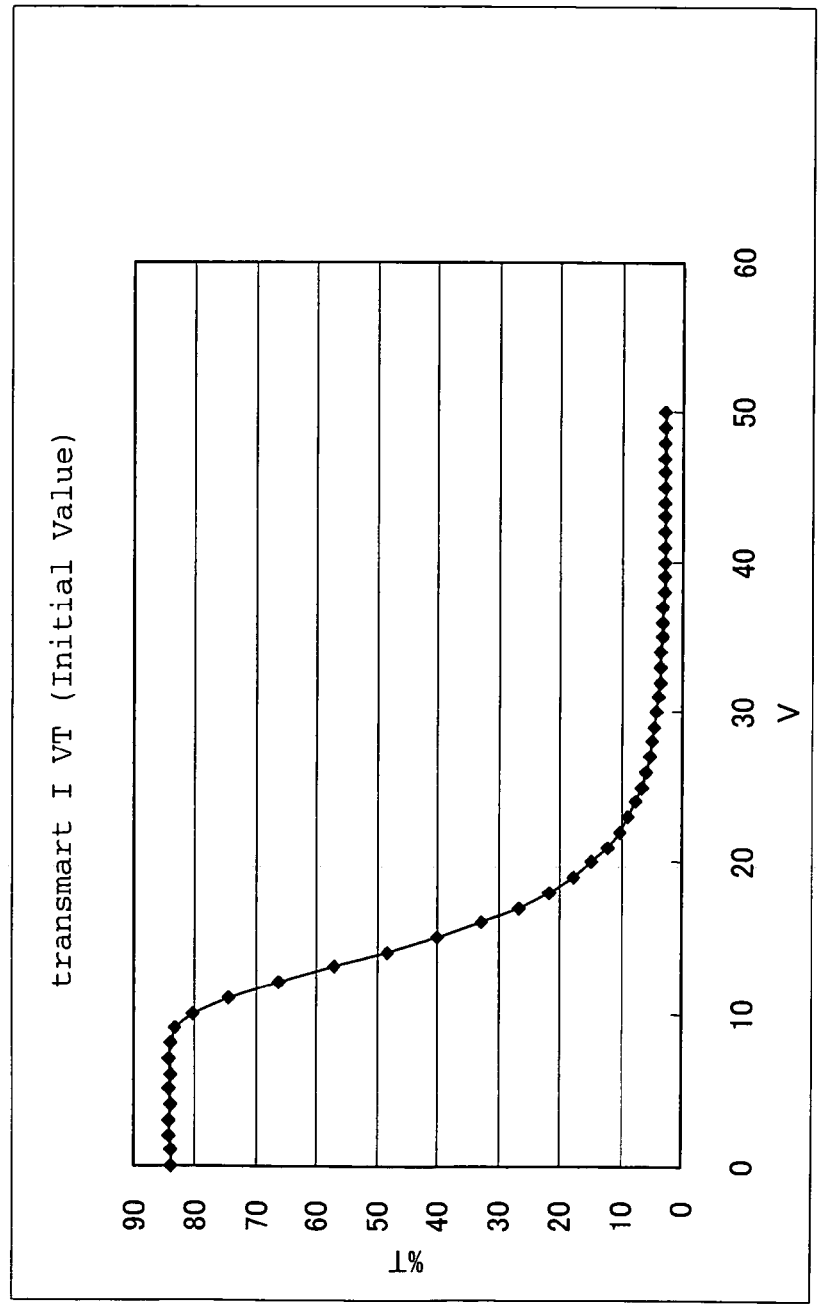
FIG. 21 is a graph showing applied voltage-transmittance characteristics of a liquid crystal element used as the screen.

FIG. 21 shows data about transmittance to driving voltages (in effective values), which were obtained by evaluation of an optical system having collection angle of 5 deg. The surfaces of the glass substrates were not subjected to an anti-reflection (AR) treatment.

A pair of alkaline type glass substrates silica coated thereon (AS: manufactured by Asahi Glass Company, Limited) were used, and the transmittance of the light from the outer surface of one of the substrates to the outer surface of the other substrate was measured.

The transmittance at the time of non-application of a voltage was about 84%. The transmittance at the time of application of a voltage of 40 V was about 3%.

Figure 9:
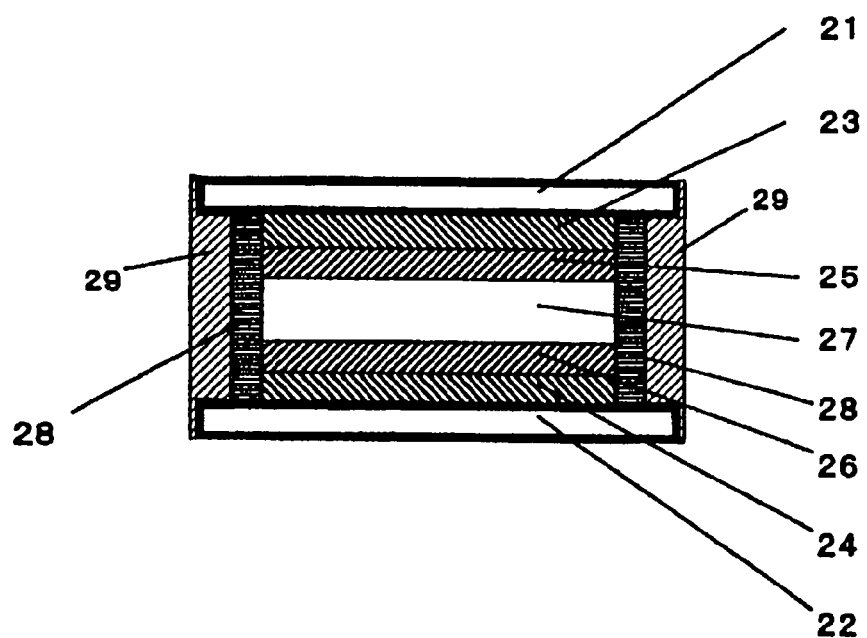
FIG. 9 is a schematic cross-sectional view showing the screen according to another embodiment of the present invention.

As shown in FIG. 9, the screen may have a sealing frame 29 made of a transparent resin to improve the mechanical strength of the peripheral portion or prevent the liquid crystal or another member from being chemically transformed. In this case, the screen is double-sealed with the transparent resin layer and the sealing frame.

As the image-projecting unit, a projector manufactured by EPSON Corp. (Model No. ELP-50) was used. As the shutter, a mechanical rotary chopper, which had a rotational speed of 60 Hz and an aperture time of about 50%, was used.

The switching of the scattering state of light passing through the liquid crystal layer of the screen was performed at 60 Hz and was synchronized with image projection on the timing as shown in FIG. 4.

The driving operation wherein the liquid crystal layer of the screen changed between the light transmissive state and the light scattering state was performed by application of an a.c. rectangular wave of 200 Hz, the voltage of which was switched between 0 V and 30 V. The rise time was about 1.5 ms, and the fall time was about 2 ms.

The screen 1, the image-projecting unit 2 and the shutter 3 were provided with respect to a viewer 4 in the arrangement shown in FIG. 3. By the image display system in this example, the viewer 4 was able to simultaneously see an image on the screen and a scene 5 behind the screen, being free from flickering. When the image display system was not active, the system gave a feeling of expanse to the viewer since the screen completely exhibited the light transmissive state at the time of non-application of a voltage. When the image display system was active, the viewer had an impression that a transparent image looked like floating in the air.

Example 2

Two screens, each of which was fabricated in the same way as Example 1, were provided as shown in FIG. 5. The screen 1 and the screen 1' were provided parallel with each other, having a gap of about 50 mm therebetween. From the position of a viewer, the two screens looked like being provided in a substantially overlapping fashion.

With respect to the image-projecting unit, two image-projecting units, each of which was the same model as Example 1, were used. With respect to the shutter, two mechanical rotary choppers, each of which was the same model as Example 1, were used and were controlled so as to be operated on the projection timing as shown in FIG. 6. The time periods $T_{11}$, $T_{12}$, $T_{21}$, $T_{22}$, $T_1$ and $T_2$ were set at $T_{11}$=4 ms, $T_{12}$=12 ms, $T_{21}$=4 ms, $T_{22}$=12 ms, $T_1$=8 ms and $T_2$=8 ms, respectively.

An image was displayed on the screen 1 by an image-projecting unit 2, and a character image was displayed on the screen 1' by the other image-projecting unit 2'. In the image display system in this example, both images were able to be simultaneously recognized without flickering, and a scene behind the screens was also able to be recognized without flickering. Thus, a three-dimensional image representation, which gave a feeling of depth to the viewer, was recognized.

When displaying a background image, such a scene of Cinderella Castle (registered trademark), on the screen 1, and displaying an image of dancing Mickey Mouse (registered trademark) on the screen 1' or the screen 1 with Mickey Mouse moving back and forth in this example, it is also possible to obtain an image representation having a feeling of depth.

When images were, respectively, displayed on the screen 1 and on the screen 1' so that both images are overlapping, it was found that the brightness of the screen 1 and the brightness of the screen 1' were able to be set at different values to obtain an image representation with perspective, wherein it was possible to realize a three-dimensional image representation without need for a pair of glasses usually required for enjoying a three-dimensional display.

When an image of Mickey Mouse, an image of Minnie Mouse (registered trademark) and an image of Cinderella Castle were displayed, it was possible to realize a three-dimensional image representation wherein a viewer had an impression that the image of Mickey Mouse was at a position nearest to the viewer, the image of Cinderella Castle was at a position farthest from the viewer and the image of Minnie Mouse was at an intermediate position, under such conditions that the image of Mickey Mouse had a brightness having a relative value of 1 on the screen 1' and a brightness having a relative value of 0 on the screen 1, the image of Minnie Mouse had a brightness having a relative value of 0.5 on the screen 1' and a brightness having a relative value of 0.5 on the screen 1, and the image of Cinderella Castle had a brightness having a relative value of 0 on the screen 1' and a brightness having a relative value of 1 on the screen 1.

Generally speaking, it is possible to realize a combination of images having different feelings of relative distance as stated earlier when in the case of using two or more of overlapping screens, images projected on two screens have different brightnesses from each other as in the example of Mickey Mouse and Cinderella Castle stated earlier. The phrase "two screens" means at least two screens, the number of combinations of images may be plural, and a screen in a combination may belong to another combination.

In this arrangement, a viewer cannot enjoy a three-dimensional image representation in some cases if he or she shifts his or her head. This is because the viewer cannot recognize the three-dimensional image representation when the image on the screen 1 and the image on the screen 1' are not composed. In many cases, in order to increase an angular range wherein a viewer can enjoy a three-dimensional image representation, it is preferable that the distance between the screen 1 and the screen 1' is short. In accordance with the present invention, it is possible to enjoy a sufficient feeling of perspective even in such a case. Generally speaking, it is preferable that the distance between adjacent screens is from 0.4 to 200 mm. However, in order to enjoy a three-dimensional image representation from almost every position with a feeling of perspective maintained, it is more preferable that the distance is from 0.4 to 50 mm. It is further preferable that the distance between adjacent screens is 2 mm±1 mm.

The front and rear sides of each of the screens were coated with an AR coating (low reflecting coating) film, which was made of a dielectric multilayer film comprising $SiO_2$ and $TiO_2$. By this treatment, the contrast was increased by a decrease in reflection of external light on the glass substrate surfaces. Additionally, it was possible to minimize a problem that images projected from the image-projecting units caused multiple reflection to make the images dim.

In the case of using a plurality of screens, it is preferable that the surfaces of the respective screen are coated with an AR film as in this example. As another method to have low reflection, there may be adopted a method wherein a resin having the same refractive index as glass is filled in the gap between adjacent screens.

Example 3

A screen was fabricated in the same way as Example 1 except that the surfaces of the polyimide films for vertical alignment were subjected to rubbing, and the pretilt angle was set at an angle of 70 deg.

In the driving operation wherein the liquid crystal layer of the screen changed between the light transmissive state and the light scattering state, the rise time was about 1.0 ms, and the fall time was about 1.5 ms.

The screen 1, the image-projecting unit 2 and the shutter 3 were provided with respect to a viewer 4 in the arrangement shown in FIG. 3. By the image display system in this example, the viewer 4 was able to simultaneously see an image on the screen and a scene 5 behind the screen, being free from flickering, as in Example 1. When a voltage was not applied, the system gave a feeling of expanse to the viewer since the screen completely exhibited the light transmissive state as in Example 1. When the image display system was active, the viewer had an impression that a transparent image looked like floating in the air.

Example 4

The image display system in Example 1 may be used as a vehicle-borne head-up display, an instrument display for car driving, an image display provided in a show window, or an information display for a purchase, provided next to a cash register in a convenience store. When the image display system is not active, the screen can be prevented itself from being unpleasant to the eye, minimize a feeling of oppression to a viewer and give a feeling of expansion to the viewer. When the image display system is active, the screen can display an image having a feeling of transparency, which allows a viewer to see a scene behind the screen.

When the image display system according to the present invention is mounted in a car, the screen may be provided in an upper portion of an instrument panel as in a head-up display provided in an existing car or in an upper portion of a center console between a driver's seat and the seat next thereto. By using the image display system according to the present invention, a driver can drive safely since he or she can visually recognize circumstances ahead of the car. When the image display system is not active, the driver has no feeling of oppression since the screen is transparent.

In this case, the image display system can display a wide range of images, such as an information image related to the car including, e.g., speed indication or alarm indication, an information on navigation, an image broadcasted by a TV station, a video image, an image transmitted through Internet, or information on an ETC system.

Even when the screen has substantially the same size as the windshield of a car, the driver can drive without trouble. The image display system may be applied to or be formed integrally with the windshield. The image display system may have the screen formed so as to occupy a portion of the windshield. The screen may be provided between front seats and rear seats. Even in the last case, the image display system according to the present invention is advantageous since a person on a front seat and a person on a rear seat can be prevented from feeling isolated.

When the image display system is used in a show window, the system can draw a passer's attention by providing the screen before an item and displaying information on the item on the screen.

When the conventional image display system is provided next to or above a cash register in, e.g., a convenience store, a customer has feeled isolated by a physical barrier between the customer and a store clerk since the conventional screen is not transparent. By using the image display system according to the present invention, a customer does not feel isolated. The image display system according to the present invention may be provided at a reception desk in a similar way. Examples of images to be displayed are explanation of items, information on items, such as items having a special price, items sold only in a limited period, or items available in a limited number, or a commercial message for such items.

Example 5

Five screens, each of which was fabricated in the same way as Example 1, were used wherein the number of screens scattering in one frame was set at two. The screen farthest from a viewer was called the screen "a", and the other screens were called the screen "b", the screen "c", the screen "d" and the screen "e" in the order in which they were nearer to the viewer. While a background image, such as an image of Cinderella Castle, was displayed on the screen "a", an image of Mickey Mouse was displayed on the screen "b" in a first frame, the image of Mickey Mouse was displayed on the screen "c" in a second frame, the image of Mickey Mouse was displayed on the screen "d" in a third frame, and the image of Mickey Mouse was displayed on the screen "e" in a fourth frame.

By this operation, the viewer was able to have an impression that Mickey Mouse was getting closer to him or her. Conversely, when an image of Mickey Mouse was moved from the screen "e" to the screen "d", to the screen "c", to the screen "b" and finally to the screen "a", the viewer was able to have an impression that Mickey Mouse was getting away from him or her. When all five screens constantly displayed images in are frame, the image representation was dark as a whole, which was not preferable. However, it was found that an equivalent brightness was realized by the use of only two screens in one frame in this example.

As the distance between adjacent screens is shorter, an image looks like moving in forward and backward directions in a more continuous fashion. The distance is preferably about 30 mm, more preferably 10 mm or shorter. It is effective to increase the number of screens in order to have a feeling of distance.

Example 6

In order to increase the screen size, four screens, each of which was fabricated in the same way as Example 1, were joined together to obtain a screen having a large size. With respect to the joined portions, the glass width at the portions corresponding to the frames outside the sealed portions was set at 0.1 mm or shorter. The portions that were located inside the sealed portion and were not provided with a light scattering function in terms of, e.g., electrical isolation had a width of 0.5 mm or shorter so as to minimize the area of the portions that displayed no image. By this arrangement, the area of the portions that were located at the joints between adjacent screens and did not contribute to scattering was minimized.

As a result, it was possible to display an image without a viewer having an unnatural feeling as a whole, though the image contained discontinuous portions.

When the portions that did not contribute to scattering, i.e., the portions that were unable to switch between the light transmissive state and the light scattering state were formed so as to constantly exhibit the light scattering state by being added with a scattering resin wherein beads having refractive indexes were dispersed in a transparent epoxy resin, such portions were able to constantly have a similar scattering property to the screens. Thus, it was possible to obtain a more natural image, which was displayed without discontinuity.

Example 7

In order to increase the screen size, plastic substrates instead of the glass substrates in Example 1 may be used. For example, the plastic substrates are formed from a polycarbonate resin having a thickness of 0.2 mm. An ITO film is deposited on a rolled polycarbonate sheet having a width of 1 m without discontinuity, and a film for vertical alignment is deposited on the ITO film. The polycarbonate sheet is cut into lengths of 2 m to prepare two substrates. A screen may be fabricated in substantially the same way as Example 1 except that a liquid with a liquid crystal material and spacer mixed is injected into the gap between the two substrates. Thus, a large screen, which has similar performances to Example 1, can be obtained.

Example 8

Figure 15:
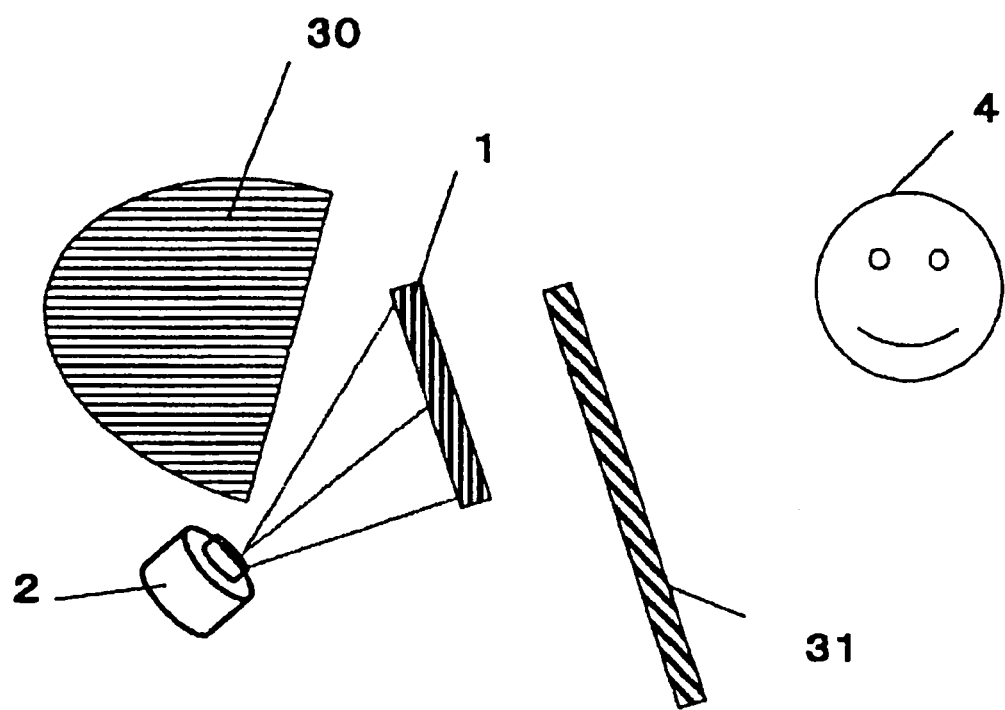
FIG. 15 is a schematic view showing how the image display system according to the present invention is used as a vehicle-borne display system.

A screen 1 was fabricated in the same way as Example 1. As shown in FIG. 15, the fabricated screen was provided between an instrument panel 30 and a steering wheel 31 in a car, and an image-projecting unit 2 was provided at a lower portion of the system so as to project an image on the screen.

Figure 16A:
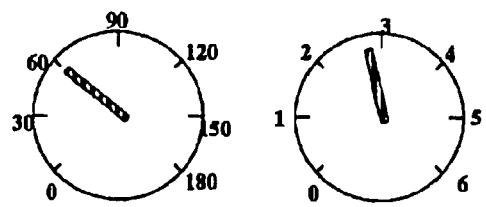
FIGS. 16(*a*) to 16(*c*) are schematic views explaining how an image on an instrument panel and an image on a screen are overlapped.
Figure 16B:
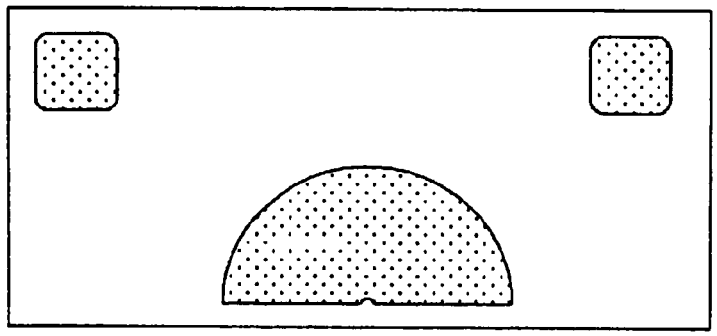
Figure 16C:
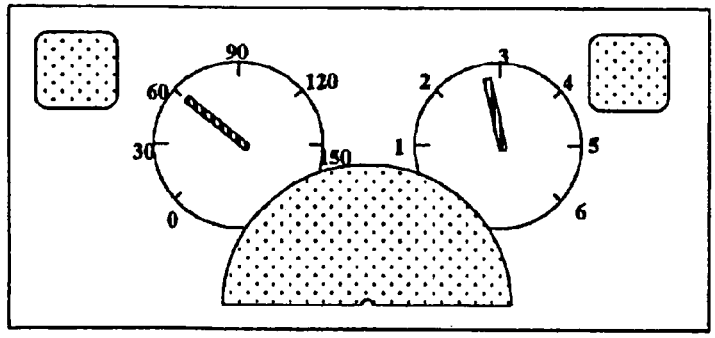

With respect to the image given by the system, an image on the screen 1 overlay an image on the instrument panel 30 so as to form a composed image as shown in FIGS. 16(*a*) to 16(*c*). The screen 1 was configured so that a voltage was applied only to dot-patterned portions shown in FIG. 16(*b*) so as to change the dot-patterned portions between transparent state and the scattering state, and that each of the dot-patterned portions was able to independently select the application of a voltage. Thus, the screen was able to apply a voltage to a desired dot-patterned portion in synchronization with projection of an image.

Figure 17A:
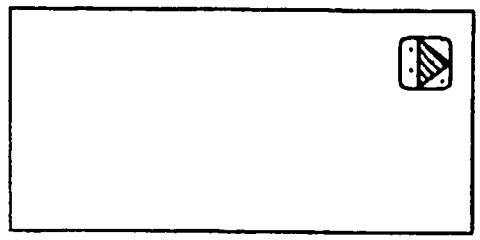
FIGS. 17(*a*) to 17(*c*) are schematic views showing how an overlapping combination of an image on the instrument panel and an image on the screen is displayed.
Figure 17B:
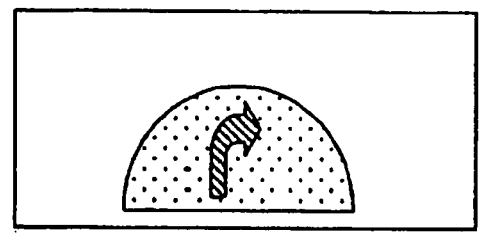
Figure 17C:
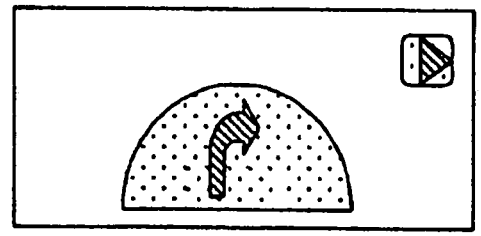

For example, FIG. 17(*a*) shows an example to display an image indicating only that a right-turn signal is given by a direction indicator. The dot-patterned portions unrelated to this image formation are in the transparent state to make the instrument panel visible without a change in brightness since the dot-patterned portions unrelated to this image formation are not in the scattering state. FIG. 17(*b*) shows an example to display only an image at a lower central position. FIG. 17(*c*) shows an example to simultaneously display images at two positions.

Figure 18A:
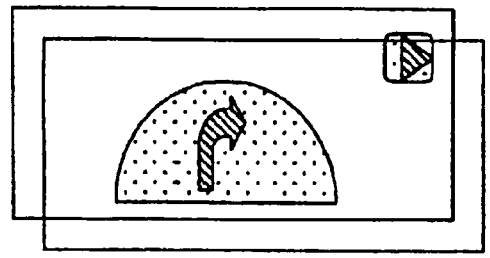
FIGS. 18(*a*) to 18(*c*) are schematic views showing how an overlapping combination of an image on the instrument panel and images on two screens is displayed.
Figure 18B:
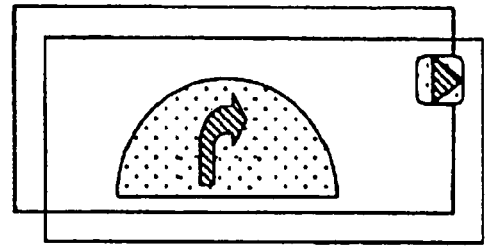
Figure 18C:
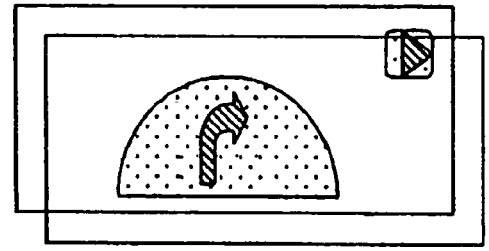

FIGS. 18(*a*) to 18(*c*) show an example wherein two screens having the same pattern as the screen shown in FIG. 17(*b*) were used. FIG. 18(*a*) shows that only two positions (an upper right position and a lower central position) of the screen farther from a viewer (nearer to the instrument panel) exhibited the scattering state to display images. FIG. 18(*b*) shows that a right position of the screen farther from the viewer changed from the scattering state into the transparent state, and that a right position of the screen nearer to the viewer exhibited the scattering state. FIG. 18(*c*) shows that the right position of the screen nearer to the viewer changed from the scattering state into the transparent state, and that the right position of the screen farther from the viewer exhibited the scattering state. By repeating the steps of from FIGS. 18(*a*) to 18(*c*) via FIG. 18(*b*) with lapse of time to change the displayed position of the right-turn indication, it was possible to draw a viewer's attention. This arrangement offered a quite unique display in comparison with the conventional flickering displays. Since the screen next to the viewer were provided with a touch panel to have a function capable of accepting the input of information, the viewer was able to respond to a selective display on a screen, which was very convenient.

Example 9

Figure 19:
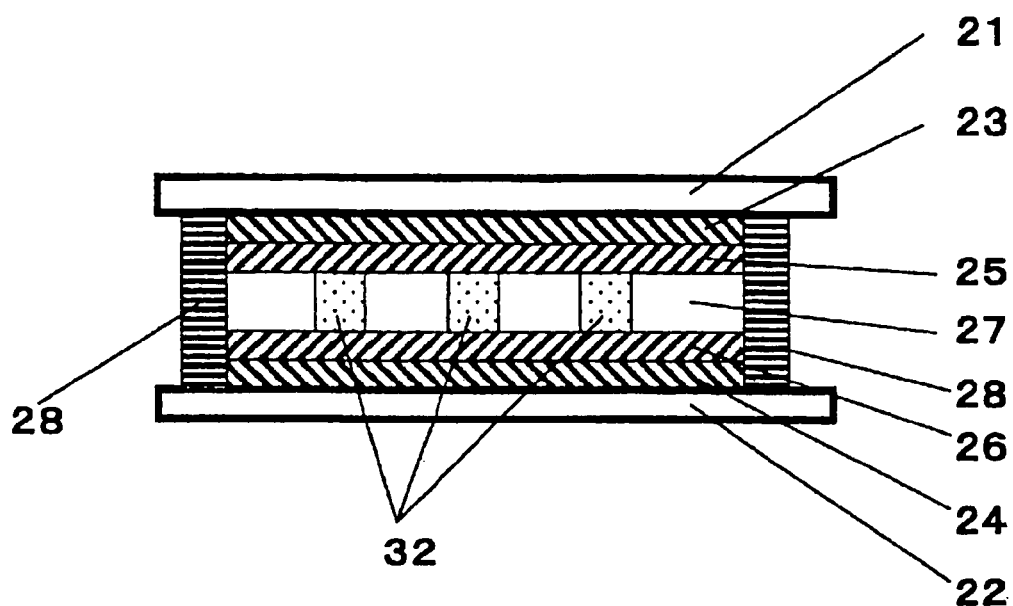
FIG. 19 is a schematic cross-sectional view showing the screen in Example 9.

Instead of resin beads for gap control in Example 1, adhesive spacers capable to bonding upper and lower substrates were used. A liquid containing the adhesive spacers was applied on one of substrates, which had polyimide films for vertical alignment (JALS-682-R3, manufactured by JSR Corporation) formed on transparent electrodes. By a pattering process using a lithographic technique, the spacers were formed at intervals of 300 μm×300 μm so as to have a size of 20 μm×20 μm and a height of 6 μm. After that, a screen was fabricated in the same way as Example 1, though the upper and lower substrates were finally bonded by heat treatment. In FIG. 19, the adhesive spacers thus formed are indicated by reference numeral 32. By this arrangement, it was possible to drastically reduce a phenomenon that the transparency at the time of non-application of a voltage was deteriorated by, e.g., impact.

The entire disclosures of Japanese Patent Application No. 2002-258234 filed on Sep. 3, 2002 and Japanese Patent Application No. 2002-337063 filed on Nov. 20, 2002 including specifications, claims, drawings and summaries are incorporated herein by reference in their entireties.

What is claimed is:

1. An image display system including:
   a screen comprising a pair of substrates with transparent electrodes provided thereon, and a liquid crystal layer sandwiched between the substrates, the liquid crystal layer being capable of exhibiting a light transmissive state and a light scattering state, and
   an image-projecting unit for projecting an image on the screen;
   wherein when a voltage is applied across confronting transparent electrodes, the liquid crystal layer exhibits the light scattering state, and when no voltage is applied across confronting transparent electrodes, the liquid crystal layer exhibits the light transmissive state;
   wherein the screen is provided to face the image-projecting unit so that when the liquid crystal layer exhibits the light scattering state, an image projecting from the image-projecting unit can be focused on the screen to be visually recognized;
   wherein a repetition frequency of a combination of the light transmissive state and the light scattering state as a minimum repetitive unit can be set at a value in such a range that a viewer cannot recognize flickering of the image on the screen recognized; and
   wherein proportions of a time period ($T_1$) wherein the liquid crystal layer of the screen exhibits the light scattering state and a time period ($T_2$) wherein the liquid crystal layer of the screen exhibit the light transmissive state are set in one frame so that the viewer can simultaneously recognize the image on the screen and a scene behind the screen.

2. The image display system according to claim 1, wherein the screen includes a plurality of screen; and the screens are provided so as to have display surfaces overlapped each other so that when the liquid crystal layers of the respective screens exhibit the light scattering state, different images projected from the image-projecting unit are displayed on the respective screens, whereby the images on the respective screens are made different each other.

3. The image display system according to claim 1, wherein the repetition frequency in the one frame is set at a value of 33 Hz or higher; and wherein the proportions of $T_1$ and $T_2$ are set so as to meet a relationship of $T_1/(T_1+T_2) \leq 0.8$.

4. An image display system including:
   a screen comprising a pair of substrates with transparent electrodes provided thereon, and a liquid crystal layer sandwiched between the substrates, the liquid crystal layer being capable of exhibiting a light transmissive state and a light scattering state, and
   an image-projecting unit for projecting an image on the screen;
   wherein when a voltage is applied across confronting transparent electrodes, the liquid crystal layer exhibits the light scattering state, and when no voltage is applied across confronting transparent electrodes, the liquid crystal layer exhibits the light transmissive state;
   wherein the screen is provided to face the image-projecting unit;
   wherein the liquid crystal layer contains a liquid crystal and a cured resin having a mesogen structure, the liquid crystal layer including liquid crystal molecules having a pretilt angle of 60 deg or more with respect to a substrate surface; and
   wherein when the liquid crystal layer exhibits the light scattering state, an image projected from image-projecting unit is be focused on the liquid crystal layer to be visually recognized.

5. The image display system according to claim 4, wherein the repetition frequency in the one frame is set at a value of 33 Hz or higher.

6. The image display system according to claim 1, wherein the screen comprises a plurality of screens, and wherein a rise time required for the liquid crystal layer of a screen to change from the light transparent state into the light transmissive state and a fall time required for of the liquid crystal layer of another screen to change from the light scattering state into the light transmissive state are set so that the rise time and the fall time temporal overlap each other when the respective screens are sequentially driven.

7. The image display system according to claim 1, wherein the screen comprises a plurality of screens so that adjacent screens have a distance of 0.4 to 200 mm therebetween; and
   wherein images projected on at least two screens have different brightnesses.

8. The image display system according to claim 1, wherein the liquid crystal and a cured resin in the liquid crystal layer are formed by curing by a photopolymerization method.

9. The image display system according to claim 1, wherein the screen has an instrument, an information terminal or a mirror provided therebehind.

10. The image display system according to claim 1, wherein the screen has a main part of a peripheral portion formed so as to be transparent.

11. The image display system according to claim 10, wherein the screen is transparent except a portion to be connected with an external circuit.

12. The image display system according to claim 1, wherein the screen has a transmittance of 80% or higher when no voltage is applied.

* * * * *